United States Patent
Okibe et al.

(10) Patent No.: US 6,329,456 B1
(45) Date of Patent: Dec. 11, 2001

(54) COATING RESIN COMPOSITION CONTAINING HYDROLYZABLE ORGANOSILANE, ACRYLIC RESIN AND POLYORGANOSILOXANE

(75) Inventors: Junko Okibe, Hirakata; Minoru Inoue, Neyagawa; Motoaki Haruna, Osaka; Ayumu Yasuda, Hirakata; Takeshi Sunaga, Kiryu; Yasuyo Iwabuchi, Oota; Norio Sato, Gunma, all of (JP)

(73) Assignees: Matsushita Electric Works, Ltd., Osaka; Toshiba Silicone Co., Ltd., Tokyo, both of (JP)

( * ) Notice: Subject to any disclaimer, the term of this patent is extended or adjusted under 35 U.S.C. 154(b) by 0 days.

(21) Appl. No.: 09/572,287

(22) Filed: May 17, 2000

Related U.S. Application Data

(62) Division of application No. 08/750,745, filed as application No. PCT/JP96/01036 on Apr. 16, 1996, now Pat. No. 6,090,873.

(30) Foreign Application Priority Data

Apr. 21, 1995 (JP) ..................................... 7-97291

(51) Int. Cl.$^7$ ..................................... C08K 3/36
(52) U.S. Cl. ..................... 524/264; 524/188; 524/268; 525/103
(58) Field of Search ..................... 524/264, 188, 524/268, 265, 506; 525/103

(56) References Cited

U.S. PATENT DOCUMENTS

| | | | |
|---|---|---|---|
| 4,786,660 | 11/1988 | Ittmann et al. | 524/265 |
| 4,895,887 | 1/1990 | Daimon et al. | 524/265 |
| 5,753,733 | 5/1998 | Ecket et al. | 524/265 |

FOREIGN PATENT DOCUMENTS

| | | |
|---|---|---|
| 2540834 | 4/1976 | (DE) . |
| 32597A1 | 7/1981 | (EP) . |
| 5051131 | 5/1975 | (JP) . |
| 6310677A | 1/1988 | (JP) . |
| 2189377 | 7/1990 | (JP) . |
| 3244666 | 10/1991 | (JP) . |
| 3258878 | 11/1991 | (JP) . |
| 4175388A | 6/1992 | (JP) . |
| 578622A | 3/1993 | (JP) . |
| WO9008810 | 8/1990 | (WO) . |
| WO9313179 | 7/1993 | (WO) . |

Primary Examiner—Christopher Henderson
(74) Attorney, Agent, or Firm—Birch, Stewart, Kolasch & Birch, LLP

(57) ABSTRACT

A coating resin composition is able to form a coating film having not only high hardness and weatherability but also high toughness, and can be cured both at room temperature and by heating curing, and further which is good at storage stability.

The coating resin composition consists essentially of a silica-dispersed oligomer solution of organosilane prepared by partially hydrolyzing a hydrolyzable organosilane represented by a formula $R^1_n SiX_{4-n}$, in colloidal silica dispersed in an organic solvent, water or a mixture thereof, and an acrylic resin which is a copolymer of acrylate or methacrylate represented by a formula, $CH_2 = CR^2(COOR^3)$, and a curing catalyst. This composition is used by separating the components into two solutions and then mixing thereof as required. A resin-coated article comprises a cured resin layer of the coating resin composition on the surface of a substrate.

4 Claims, 1 Drawing Sheet

COATING RESIN COMPOSITION CONTAINING HYDROLYZABLE ORGANOSILANE, ACRYLIC RESIN AND POLYORGANOSILOXANE

This application is a divisional of co-pending application Ser. No. 08/750,745, filed on Dec. 20, 1996 now U.S. Pat. No. 6,090,873. application Ser. No. 08/750,745 is the national phase of PCT International application No. PCT/JP96/01036 filed on Apr. 16, 1996 under 35 U.S.C. § 371. The entire contents of each of the above-identified applications are hereby incorporated by reference.

FIELD OF THE INVENTION

The present invention relates to a coating resin composition, a resin-coated article and a method for producing the same. In more detail, the invention relates to a coating resin composition which is used for coating the surface of a substrate, such as steels like stainless steel, non-ferrous metals like aluminum, inorganic building materials like concretes or slates, plastic substrates, woods, and the like, where the coating resin composition can be cured by being left at room temperature or by being subjected to a heat treatment, and which is capable of forming a coating film high in hardness and good at heat resistance and weatherability, and the invention also relates to a method for producing the same. And the invention also relates to a resin-coated article and a method for producing the same, which comprise cured resin layer of the coating resin composition on the surface of the substrate.

BACKGROUND ART

Coating agents obtained by hydrolyzing or partially hydrolyzing hydrolyzable organosilanes, or coating agents in which colloidal silica is mixed with such coating compositions have conventionally been known as coating agents for forming water-resistant coating films intended for the surface protection of steels like stainless steel, non-ferrous metals like aluminum, inorganic building materials such as concretes or slates, woods, plastic substrates, and the like.

For example, Japanese Patent Laid-Open Publications SHO 51-2736, SHO 51-2737, SHO 53-130732, and SHO 63-168470 have proposed coating agents composed of organoalkoxysilanes, hydrolyzates and/or partial condensates of the organoalkoxysilanes, and colloidal silica, in which alkoxy groups are converted to silanols by excess water. However, while coating films obtained from these coating agents are excellent for the use of substrate protection by virtue of their high hardness and good weatherability, they are poor in toughness and, in the case of coating films having a film thickness of 10 $\mu$m or more, would easily develop cracks during heat curing process, in outdoor use, or at the eruption of abrupt temperature changes. Also, in the coating process, it is difficult to control the thickness of a coating film strictly below 10 $\mu$Mm or less, such that the film thickness would be more likely to exceed 10 $\mu$m on the coating surface or around the coating article or at recessed portions of the coating surface, thus likely causing production faults. In order to obtain desired coating film characteristics, the coating films obtained from these coating agents need to be subjected to a heat treatment at a high temperature of about 100° C. or more or for a long time, such that the coating agents could not be used in some cases depending on the molding method or size of the substrate, or weatherability, or outdoor and other locations, inconveniently. Moreover, there has been an issue that these coating resin compositions are high in reactivity of silanol resulting from hydrolysis of alkoxysilane, so that their condensation reaction gradually proceeds even at room temperature, causing gelation to occur, with the result of poor stability. In particular, when it is attempted to derive a paint from these coating compositions as a vehicle of paint by adding pigments, the stability would be further deteriorated such that the coating resin compositions could not be formed into a paint, as a drawback.

As disclosed in Japanese Patent Laid-Open Publication SHO 64-168, a coating agent has also been proposed in which alkoxy groups are converted into silanols by adding water as a curing agent and a catalyst to partial hydrolyzates or partial condensates of alkoxysilane immediately before the coating process. This coating agent, however, is also so poor in toughness that cracks would easily develop with the film thickness of 10 $\mu$m or more. While this coating agent is stable in preservation and keeps relatively stable even if formed into a paint with pigments added, it is necessary for obtaining desired coating film characteristics to subject the coating agent to a heat treatment at a high temperature of about 100° C. or more or for a long time. Thus, the coating agent could not be used depending on the molding method or size of the substrate, or weatherability, or outdoor and other locations.

For the purpose of solving these and other drawbacks, a coating agent which is composed of a prepolymer containing a silicon alkoxide as a main component, a curing catalyst, and water and which cures at around room temperature has been proposed in Japanese Patent Laid-Open Publication SHO 63-268772. However, this coating agent has not been improved in toughness, so that it is impossible to do processings of precoating metals after coating, processings of polycarbonate plates after a coat treatment, and the like. Also the coating agent is poor in coatability and curability, showing a drawback that the curability of the coating agent tends to be affected by humidity.

A coating agent which contains a partial hydrolyzed oligomer of organosilane, a silanol-group-containing polyorganosiloxane, and a curing catalyst, has been disclosed in Japanese Patent Laid-Open Publication HEI 4-175388. However, while this coating agent has a merit that the toughness and curability of the coating agent are improved and are not affected by humidity, the toughness of the coating agent has not been improved sufficiently.

In summary, coating agents containing organoalkoxysilane or a hydrolyzate of organoalkoxysilane as a main component have proved to be able to produce coating films that are high in hardness, unlikely to be flawed, and good at weatherability. However, because of poor toughness, the coating films will be easily cracked in the coating process or during use, which can be seen noticeably especially when the film thickness becomes 10 $\mu$m or more. Further, the coating agents need a baking process at a high temperature of 100° C. or more, so that they indeed can be applied to coating at factories, but have difficulty in outdoor or field coating. Besides, the coating agents are defective in high reactivity of their coating fluid and therefore poor in storability of their coating formulations.

Resins having, as the main chain, acryl, polyester, epoxy, polyether, vinyl, or other organic resins as well as functional groups of hydrolyzable silane have also been reported. They can be seen, for example, in Japanese Patent Laid-Open Publications HEI 5-287206 and HEI 5-302007. However, since the main chain is composed of organic resins, those resins are inferior in weatherability and hardness to the resins having organoalkoxysilanes as the main component. Otherwise, reactive resins having linear polysiloxanes in their main chains and functional groups of polymerizable acrylate in their terminals or side chains have also been proposed in Japanese Patent Laid-Open Publications HEI 5-72928 and HEI 5-178998. However, since the main chain is a linear polysiloxane, these resins cannot attain sufficient hardness, and in some cases, they are of rubber elastic material, thus unsuitable for coating-use resins.

Aforementioned concretes, cement substrates, or inorganic curing bodies are indeed excellent materials good at heat resistance and durability, but defective in that moisture would invade when their surfaces are not coated, and that they are inferior in stain resistance and acid resistance. Besides, uncoated appearance of those materials are not of a beauty in many cases.

To make up for these defects, it has been practiced to coat their surface with organic coating materials. However, organic coating materials are poor in weatherability and low in film hardness so that they are easily flawed, as a drawback.

For this reason, attempts have been made to apply inorganic coating agents related to water glass, instead of the organic coating materials. However, these attempts have shown no satisfactory results in terms of the generation of efflorescence and porosity.

DISCLOSURE OF THE INVENTION

An object of the present invention is to provide a coating resin composition, as well as a method for producing the same, which is able to form a coating film having not only high hardness and weatherability but also high toughness; which does not yield any cracks even at a film thickness of 10 $\mu$m or more; which can be cured and dried at room temperature and moreover cured by heat-acceleration at a low temperature of 100° C. or less; which is so good at storage stability as to derive the aforementioned high-performance coating film stably for more than one year; and which can be used as a stable vehicle in making a paint with pigments added so that it is freely colorable with pigments added. Also An object of the present invention is to provide a resin-coated article and a method for producing the same, which comprise cured resin layer of the coating resin composition on the surface of the substrate.

The coating resin composition according to the present invention consists essentially of:

(A) a silica-dispersed oligomer solution of organosilane prepared by partially hydrolyzing a hydrolyzable organosilane represented by a general formula $$R^1_n SiX_{4-n} \quad (I)$$

(wherein $R^1$ is a homo- or hetero-substituted or non-substituted univalent hydrocarbon group or phenyl group having a carbon number of 1 to 9, n is an integer of 0 to 3, and X is a hydrolyzable functional group) in colloidal silica dispersed in an organic solvent, water or a mixture thereof;

(B) an acrylic resin which is a copolymer of: at least one of first acrylates or methacrylates represented by a general formula $$CH_2=CR^2(COOR^3) \quad (II)$$

(wherein $R^2$ is a hydrogen atom or a methyl group) in which $R^3$ is a substituted or non-substituted univalent hydrocarbon having a carbon number of 1 to 9; at least one of second acrylates or methacrylates represented by the general formula (II) in which $R^3$ is an epoxy group, a glycidyl group or a hydrocarbon group containing them; and at least one of third acrylates or methacrylates represented by the general formula (II) in which $R^3$ is a hydrocarbon group containing an alkoxysilyl group or a halogenated silyl group; and (C) a curing catalyst.

It is preferable that the component (A) is a silica-dispersed oligomer solution of organosilane prepared by hydrolyzing the hydrolyzable organosilane under a condition using 0.001 to 0.5 mole of water on the basis of one equivalence of a hydrolyzable functional group (X).

The component (A) preferably contains a silica portion (in Si content as converted into the weight ratio of $SiO_2$) of 5 to 95% by weight as a solid fraction.

It is preferable that at least 50 mol % of the hydrolyzable organosilane in the component (A) is a organosilane with n=1.

It is preferable that the pH value of the component (A) is in a range of 2.0 to 7.0.

The acrylic resin in the component (B) preferably contains as a copolymerizable monomer; at least one selected from the group consisting of n-butyl methacrylate and n-butyl acrylate; at least one selected from the group consisting of trimethoxysilylpropyl methacrylate and trimethoxysilylpropyl acrylate; and at least one selected from the group consisting of glycidyl methacrylate and glycidyl acrylate.

The acrylic resin in the component (B) may further contain at least one selected from the group consisting of thiols, thiophenols and their derivatives.

The weight average molecular weight, as converted into polystyrene, of the acrylic resin in the component (B) is preferably in a range of 1,000 to 50,000, more preferably in a range of 1,000 to 12,000.

It is preferable that, in the coating resin composition of the invention, 1 to 99 parts by weight of the component (B) is blended on the basis of 1 to 99 parts by weight of the component (A) (where a total of component (A) and component (B) is 100 parts by weight).

It is preferable that the curing catalyst in the component (C) is at least one selected from the group consisting of alkyltitanates, tin carboxylates, aluminum compounds, amine salts, amine base silane coupling agents, halogenated silanes, acids and alkalines.

Preferably, the coating resin composition according to the invention further contains, as an essential component, (D) polyorganosiloxane which is represented by a mean composition formula;

$$R^4_a Si(OH)_b O_{(4-a-b)/2} \quad (III)$$

(wherein $R^4$ is a homo- or hetero-substituted or non-substituted univalent hydrocarbon group or phenyl group having a carbon number of 1 to 9, and a and b are numerals satisfying the relationships of $0.2 \leq a \leq 2$, $0.0001 \leq b \leq 3$, and $a+b<4$, respectively), and which contains a silanol group in the molecule.

In this coating resin composition further containing the component (D), it is preferable that 5 to 50 parts by weight of the component (B) and 1 to 94 parts by weight of the component (D) are blended on the basis of 1 to 94 parts by weight of the component (A) (where a total of components (A), (B) and (D) is 100 parts by weight).

The weight average molecular weight, as converted into polystyrene, of the component (D) is preferably in a range of 700 to 20,000.

The coating resin composition of the invention may further contain (E) a pigment as an essential component.

The coating resin composition according to the present invention is a two-part coating resin composition which consists of a resin solution containing the component (A) and the component (B) and a resin solution containing the component (C), and is used by mixing thereof on using.

Also the coating resin composition according to the present invention may be used by mixing a resin solution containing the component (A) and the component (C) with a resin solution containing the component (B).

Further, the coating resin composition according to the present invention may be used by mixing a resin solution containing the component (A) with a resin solution containing the component (B) and the component (C).

Further, the coating resin composition according to the present invention, in case of containing the component (D) as an essential component, can be used by mixing a resin solution containing the component (A), the component (B) and the component (C) with a resin solution containing the component (D), also can be used by mixing a resin solution containing the component (A) and the component (C) with a resin solution containing the component (B) and the component (D). Also the coating resin composition may be used by mixing a resin solution containing the component (A), component (B), and the component (C) with a resin solution containing the component (C) and the component (D).

A resin-coated article according to the present invention comprises a cured resin layer of the coating resin composition according to the present invention on the surface of a substrate.

The resin-coated article according to the present invention may comprises at least two resin layers on the surface of the substrate as the occasion demands, and in this case, at least one of these resin layers is a cured resin layer of the coating resin composition according to the present invention.

Preferably, the resin-coated article according to the present invention further comprises a primer layer, as a first layer, between the substrate and the resin layer.

It is preferable that the primer layer is a cured resin layer of a primer composition which contains, 10% by weight and more as a solid fraction, at least one selected from the group consisting of an epoxy resin, an acrylic resin, an acrylic silicone resin, a chlorinated rubber resin, an urethane resin, a phenolic resin, a polyester resin and a melamine resin.

It is preferable that the primer layer is a cured resin layer of a primer composition which consists essentially of:

(a-1) 100 parts by weight of an isocyanate prepolymer containing at least of two isocyanate groups but no urethane bond in the one molecule;

(b-1) 1 to 100 parts by weight of an organic silicon compound containing at least one mercapto group and at least two alkoxy groups in the one molecule;

(c-1) 100 or less parts by weight of an epoxy-modified silicon resin; and (d-1) 0.01 to 30 parts by weight of an organotin compound and/or a tin salt of organic acid.

It is preferable that the isocyanate groups of the isocyanate prepolymer in the component (a-1) are not bonded to a benzene ring directly.

It is preferable that the primer layer is a cured resin layer of a primer composition which consists essentially of:

(a-2) 100 parts by weight of a hydrolyzable-group-containing vinyl copolymer prepared by copolymerizing 99.5 to 75 mol % of an ethylene-type monomer and an unsaturated-group-containing silicon compound represented by a general formula $RSiX_mR'_{(3-m)}$ (wherein R is an univalent hydrocarbon group containing a vinyl group, R' is an univalent hydrocarbon group having a carbon number of 1 to 10, X is a hydrolyzable functional group selected from the group consisting of an alkoxyl group having a carbon number of 1 to 4, an alkoxyalkoxyl group having a carbon number of 2 to 6, and an oxime group having a carbon number of 2 to 4, m is an integer of 1 to 3); and (b-2) 0.1 to 50 parts by weight of an epoxy-modified silicon resin.

The primer layer may contain a pigment as the occasion demands.

At least one of the resin layer may be a cured resin layer with a pattern formed by a divisional coating and/or a wet-on-wet coating of a resin composition containing at least two pigments.

At least one of the resin layer may be a cured resin layer of the coating resin composition containing at least one of a pigment, and then on this cured resin layer of the coating resin composition, a cured resin layer of the coating resin composition not containing any pigments may be formed.

The resin-coated article according to the present invention may being done at least one of processings selected from the bending, a drawing, a punching, a boring, a cutting, and a pressing.

It is preferable that the substrate is any one of steels, non-ferrous metals, inorganic curing bodies, glasses, plastic substrates, or woods.

It is preferable that the inorganic curing bodies has bulk density of 0.5 g/cm$^3$ and more, and dimensional change of the mineral cured material under a condition changing from saturated-water-containing to absolute drying is 0.5% and less.

The inorganic curing bodies may have a tongue processed portion and/or a uneven design.

A method for producing of a resin-coated article according to the present invention comprises a step of forming at least one resin layer on the surface of a substrate. At least one the resin layer is formed by curing the coating resin composition according to the present invention after coating the coating resin composition on the surface of the substrate.

The method for producing of a resin-coated article according to the present invention may further comprises a step of forming a primer layer, as a first layer, on the surface of the substrate by coating a primer composition on the surface of the substrate and then curing the primer composition.

The method for producing of a resin-coated article according to the present invention may further comprises a step of doing at least one of processings selected from the bending, a drawing, a punching, a boring, a cutting, and a pressing, after forming the primer layer and/or the resin layer on the surface of the substrate.

The method for producing of a resin-coated article according to the present invention may further comprises a step of at least one resin layer after doing the processings.

It is preferable that the substrate is anyone of steels, non-ferrous metals, inorganic curing bodies, glasses, plastic substrates, or woods.

It is preferable that the inorganic curing bodies has bulk density of 0.5 g/cm$^3$ and more, and dimensional change of the mineral cured material under a condition changing from the saturated-water-containing to the absolute drying is 0.5% and less.

It is preferable that the inorganic curing bodies has a tongue processed portion and/or a uneven design.

BEST MODE OF CARRYING OUT THE INVENTION

Figure 1:
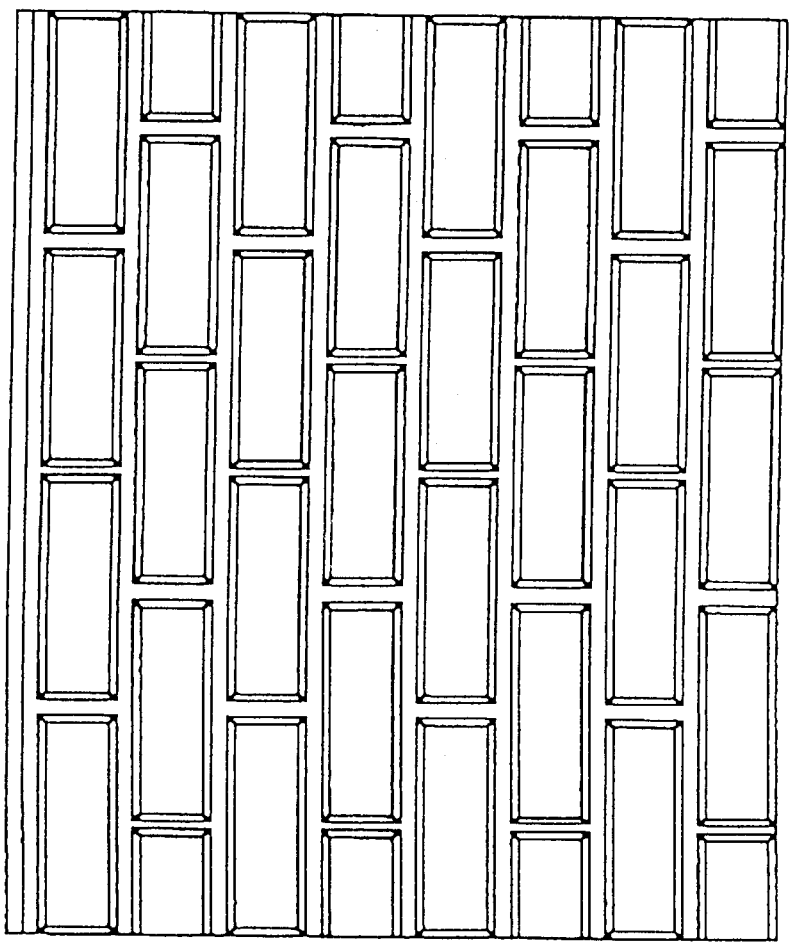
FIG. 1 is plan view illustrating one example of processing inorganic curing bodies being used in the present invention.

First, the coating resin composition according to the present invention are described.

The coating resin composition according to the present invention contains the component (A), the component (B) and the component (C) as essential components, further contains the component (D) as the occasion demands.

The silica dispersed oligomer of the component (A) is a main component of base polymers having hydrolyzable functional groups (X) as functional groups participating in the curing reaction during the formation of coating films. This oligomer can be prepared by partially hydrolyzing hydrolyzable organosilanes with water in the colloidal silica or with separately added water after adding one or more kinds of the hydrolyzable organosilanes represented by the general formula (I) into the colloidal silane dispersed in an organic solvent or water (including a mixed solvent of organic solvent and water).

$R^1$ group in the hydrolyzable organosilanes represented by the general formula (I) is a substituted or non-substituted univalent hydrocarbon group having a carbon number of 1 to 9, examples of them being an alkyl group such as methyl group, ethyl group, propyl group, butyl group, pentyl group, hexyl group, heptyl group, or octyl group; a cycloalkyl group such as cyclopentyl group or cyclohexyl group; an aralkyl group such as 2-phenylethyl group, 2-phenylpropyl group, or 3-phenylpropyl group; an aryl group such as phenyl group or tolyl group; an alkenyl group such as vinyl group or allyl group; a halogenated hydrocarbon group such as chloromethyl group, γ-chloropropyl group, or 3,3,3-trifluoropropyl group; and a substituted hydrocarbon group such as γ-methacryloxypropyl group, γ-glycidoxypropyl group, 3,4-epoxycyclohexylethyl group, or γ-mercaptopropyl group; and the like. Among these groups, alkyl groups and phenyl groups having a carbon number of 1 to 4 are preferable in terms of their readiness of synthesis or high availability.

Examples of hydrolyzable functional groups X are an alkoxy group, an acetoxy group, an oxime group (—O—N=C—R(R')), an enoxy group (—O—C(R)=C(R')R"), an amino group, an aminoxy group (—O—N(R)R'), or an amide group (—N(R)—C(=O)—R') (wherein R, R' and R" are such as a hydrogen atom or an univalent hydrocarbon group each independently). Among these groups, alkoxy groups are preferable because they are readily available and allow a silica-dispersed organosilane oligomer solution to be easily prepared.

Examples of these hydrolyzable organosilanes are either of mono-, di-, tri- or tetra-functional alkoxysilanes, acetoxysilanes, oximesilanes, enoxysilanes, aminosilanes, aminoxysilanes, amidosilanes, and the like with n in the general formula (I) being an integer of 0 to 3. Among these compounds, alkoxy silanes are preferable because they are readily available and allow a silica-dispersed organosilane oligomer solution to be easily prepared.

More particularly, examples of tetra-alkoxysilanes with n=0 are tetramethoxysilane or tetraethoxysilane, while examples of organotrialkoxysilanes with n=1 are methyl trimethoxysilane, methyl triethoxysilane, methyl triisopropoxysilane, phenyl trimethoxysilane, 3,3,3-trifluoropropyl trimethoxysilane, and the like. Examples of di-organo dialkoxysilanes with n=2 are dimethyl dimethoxysilane, dimethyl diethoxysilane, diphenyl dimethoxysilane, diphenyl diethoxysilane, methylphenyl dimethoxysilane, while examples of tri-organo alkoxysilanes with n=3 are trimethyl methoxysilane, trimethyl ethoxysilane, trimethyl isopropoxysilane, dimethylisobutyl methoxysilane, and the like.

These hydrolyzable organosilanes represented by the general formula (I) preferably contain 50 mol % or more, more preferably, 60 mol % or more of trifunctional group represented by n=1. When this proportion is less than 50 mol %, sufficient hardness of the coating film cannot be obtained, while the drying curability may be poor in some cases.

Colloidal silica in the component (A) is necessary for the coating film of the coating resin composition of the invention to have high hardness. Water-dispersible or organic-solvent-dispersible colloidal silica can be applied for this purpose. Since such colloidal silica usually contains 20 to 50 wt % of solid fraction of silica, the amount for blending silica can be determined from this value. When the water-dispersible colloidal silica is used, water existing as a component other than the solid fraction can be used for hydrolyzing the hydrolyzable organosilane in the component (A). While the material is usually made from water glass, such a colloidal silica is readily available in commercial products. The organic-solvent-dispersible colloidal silica can be easily prepared by replacing water in the water-dispersible colloidal silica with an organic solvent. Such an organic-solvent-dispersible colloidal silica is, like the water-dispersible colloidal silica, also available in commercial products. Examples of organic solvent in which the colloidal silica is dispersed are lower aliphatic alcohols such as methanol, ethanol, isopropanol, n-butanol, or isobutanol; ethyleneglycol derivatives such as ethyleneglycol, ethyleneglycol monobutylether, or ethyleneglycol acetate monoethylether; diethyleneglycol derivatives such as diethyleneglycol or diethyleneglycol monobutylether; and diacetone alcohol, where a solvent or a mixture of two or more of the solvents selected from the group consisting of these solvents can be used. Toluene, xylene, ethyl acetate, butyl acetate, methylethyl ketone, methylisobutyl ketone, methylethyl ketone oxime, or the like may also be used together with these hydrophilic organic solvents.

In the component (A), the colloidal silica is preferably contained as a solid fraction of silica portion (in Si content as converted into the weight ratio of $SiO_2$) in range of 5 to 95 wt %, more preferably 20 to 80 wt %. With the content less than 5 wt %, desired hardness of the coating film cannot be obtained, while with the content over 95 wt %, homogeneous dispersion of silica becomes difficult such that the component (A) may gelate.

The silica-dispersed oligomer in the component (A) can be prepared by partially hydrolyzing the hydrolyzable organosilane represented by the general formula (I) in the water-dispersed colloidal silica or organic-solvent-dispersed colloidal silica. The amount of addition of water to the hydrolyzable organosilane is desirably 0.001 to 0.5 mole on the basis of one equivalence of the hydrolyzable functional group (X). With this ratio less than 0.001 mole, a sufficient amount of hydrolyzate cannot be obtained, while with the ratio more than 0.5 mole, the stability of partial hydrolyzate will be poor. The method of the partial hydrolyzation is not particularly limited but a required amount of water may be added to a mixture of the hydrolyzable organosilane with the colloidal silica, where a partial hydrolysis reaction proceeds at room temperature. For the purpose of accelerating the partial hydrolysis reaction, an organic acid or inorganic acid such as hydrochloric acid, acetic acid, halogenated silane, chloroacetic acid, citric acid, benzoic acid, dimethyl malonate, formic acid, propionic acid, glutaric acid, glycolic acid, maleic acid, malonic acid, toluenesulfonic acid, or oxalic acid may be used as a catalyst.

The pH value of the solution of the component (A) is preferably 2.0 to 7.0, more preferably, 3.0 to 6.0, in order to obtain a long-term storage stability. When the pH value is out of this range, the long-term stability may be largely deteriorated under the condition that the amount of water used is 0.3 mole or more with respect to 1 equivalence of X. With the pH value of the component (A) out of the above range, the value may be adjusted, if in more acidic range, by adding basic reagents such as ammonia or ethylenediamine, and, if in more basic, by adding acidic reagents such as hydrochloric acid, nitric acid or acetic acid. However, the method for adjusting the pH value is not particularly limited.

The acrylic resin that is the component (B) is a crucial component having an effect of improving the toughness of the coating film derived from the coating resin composition of the invention. The acrylic resin is a copolymer of the first, second and third acrylates or methacrylates represented by the general formula (II). The first acrylates or methacrylates are at least one of the compounds in which $R^3$ in the formula (II) is a substituted or non-substituted univalent hydrocarbon group having a carbon number of 1 to 9 which is exemplified by an alkyl group such as methyl group, ethyl group, n-propyl group, i-propyl group, n-butyl group, i-butyl group, sec-butyl group, tert-butyl group, pentyl group, hexyl group, heptyl group or octyl group; a cycloalkyl group such as cyclopentyl group or cyclohexyl group; an aralkyl group such as 2-phenylethyl group, 2-phenylpropyl group or 3-phenylpropyl group; an aryl group such as phenyl group or tolyl group; a halogenated hydrocarbon group such as chloromethyl group, γ-chloropropyl group or 3,3,3-trifluoropropyl group; or a hydroxy hydrocarbon group such as 2-hydroxyethyl group. The second acrylates or methacrylates are at least one of the compounds in which $R^3$ in the formula (II) is an epoxy group, glycidyl group or a hydrocarbon group containing either one of them such as γ-glycidoxypropyl group. The third acrylates or methacrylates are at least one of the compounds in which $R^3$ in the formula (II) is a hydrocarbon group containing an alkoxysilyl group or a halogenated silyl group such as trimethoxysilylpropyl group, dimethoxymethylsilylpropyl group, monomethoxydimethylsilylpropyl group, triethoxysilylpropyl group, diethoxymethylsilylpropyl group, ethoxydimethylsilylpropyl group, trichlorosilylpropyl group, dichloromethylsilylpropyl group or chlorodimethylsilylpropyl group. The component (B) is a copolymer of acrylates or methacrylates containing at least each one of the aforementioned first, second and third acrylates or methacrylates, i.e., at least three compounds. The component (B) may be a copolymer containing further one or more compounds selected from the first, second and third acrylates or methacrylates described above, or another one or more compounds selected from thecrylates or methacrylates other than those described above.

The first acrylates or methacrylates described above are essential components for improving the toughness of the coating film, and besides have an effect of improving the compatibility between the component (A) and component (D). For that purpose, the substituted or non-substituted hydrocarbon group in $R^3$ desirably has a volume beyond a certain level, and preferably has a carbon number of 2 or more. The second acrylates or methacrylates are essential components for improving the adhesive property of the coating film on substrates. The third acrylates or methacrylates serve for forming chemical bonds among the component (A) and component (B), and the component (D) which is used when necessary, during the coating film curing process, by which the component (B) is fixed in the coating film. The third acrylates or methacrylates also have an effect of improving the compatibility among the component (A) and component (B), and the component (D) which is used when necessary.

The molecular weight of the acrylic resin that is the component (B) largely affects the compatibility with the component (A), and component (D) which is used when necessary. When the molecular weight of the acrylic resin of the component (B) exceeds a weight average molecular weight of 50,000 (as converted into polystyrene), it results in a phase separation so that the coating film may be whitened. Therefore, it is desirable that the weight average molecular weight of the acrylic resin of the component (B), as converted into polystyrene, should be 50,000 or less, preferably 12,000 or less. In addition, the lower limit of the weight average molecular weight of the acrylic resin of the component (B) is desirably 1000 (as converted into polystyrene). When the molecular weight is less than 1000, the toughness of the coating film lowers so that the film becomes easy to crack, which is not preferable. The second acrylates or methacrylates having an epoxy group is desirably 2% or more in the molar ratio of monomers in the copolymer. When the ratio is less than 2%, adhesive property of the coating film will be insufficient. The third acrylates or methacrylates having an alkoxysilyl group or a halogenated silyl group is desirably in a range of 2 to 50% in the molar ratio of monomers in the copolymer. When the ratio is less than 2%, compatibility of this component (B) with the component (A) and, with the component (D) that is used when necessary, is so poor that the coating film may be whitened. When the ratio of the component (B) exceeds 50%, binding density among the component (B) and component (A), and the component (D) that is used when necessary, becomes so high that improvement of toughness that is the original object of adding the component (B) cannot be achieved.

For the synthesis of the component (B), a radical polymerization process by solution polymerization, emulsion polymerization or suspension polymerization, or an anion polymerization process, or a cation polymerization process in a known organic solvent is used. However, the process is not limited to these.

In the radical polymerization process by solution polymerization, for example, monomers of the first, second or third acrylates or methacrylates are dissolved in an organic solvent in a reaction vessel by a known method and, after adding a radical polymerization initiator, the mixture is allowed to react by heating under nitrogen stream. The organic solvent is, although not particularly limited, for example, toluene, xylene, ethyl acetate, butyl acetate, methylethyl ketone, methyl-isobutyl ketone, ethyleneglycol monobutylether, diethyleneglycol monobutylether, ethyleneglycol acetate monoethylether, or the like. The radical polymerization initiator is, although not particularly limited, for example, cumene hydroxyperoxide, tert-butyl hydroxyperoxide, dicumyl peroxide, di-tert-butylperoxide, benzoyl peroxide, acetyl peroxide, lauroyl peroxide, azobisisobutyronitrile, hydrogenperoxide-$Fe^{2+}$ salt, persulfate-$NaHSO_3$, cumene hydroperoxide-$Fe^{2+}$ salt, benzoylperoxide-dimethylaniline, peroxides-triethylaluminium, or the like. For controlling the molecular weight, chain transfer agents may be added. The chain transfer agents are not particularly limited but, for example, quinones such as monoethyl hydroquinone or p-benzoquinone; thiols such as ethyl mercaptoacetate, n-butyl mercaptoacetate, 2-ethylhexyl mercaptoacetate, mercaptocyclohexane, mercaptocyclopentane or 2-mercaptoethanol; thiophenols such as di-3-chlorobenzene thiol, p-toluene thiol or benzene thiol; thiol derivatives such as γ-mercaptopropyl trimethoxysilane; phenylpicryl hydrazine; diphenylamine; or tert-butyl catechol can be used.

The component (C), the curing catalyst, accelerates the condensation reaction among the component (A) and component (C), and the component (D) that is used when necessary, thereby curing the coating film. Examples of such catalysts are alkyltitanates; tin carboxylates such as tin octylate, dibutyl tin dilaurylate, or dioctyl tin dimaleate; amine salts such as dibutylamine-2-hexoate, dimethylamine acetate or ethanolamine acetate; tert-ammonium carboxylates such as tetramethylammonium acetate; amines such as tetraethylpentamine; amine base silane coupling agents such as N-β-aminoethyl-γ-aminopropylmethyl dimethoxysilane; acids such as p-toluenesulfonic acid, phthalic acid, or hydrochloric acid; aluminum compounds such as aluminum alkoxydes or aluminum chelates; alkaline catalysts such as potassium hydroxide; titanium compounds such as tetraisopropyl titanate, tetrabutyl titanate, or titanium tetraacetylacetonate; and halogenated silanes such as methyl trichlorosilane, dimethyl dichlorosilane, or trimethyl monochlorosilane. However, the agent is not particularly limited as far as it is effective for condensation among the component (A) and the component (B), and the component (D) that is used when necessary.

The polyorganosiloxane containing silanol groups, which is the component (D) that is used when necessary, is a component which is represented by the mean composition formula (III) and which participates in the formation of the cured coating film by condensation reaction together with the component (A) and the component (B), thus serving for further improving the smoothness, mechanical strength and toughness of the coating film. Examples of $R^4$ in the formula (III) are identical with those of $R^1$ in the formula (I), but preferably substituted hydrocarbons such as alkyl group, phenyl group, vinyl group, γ-glycidoxypeopyl group, γ-aminopropyl group or 3,3,3-trifluoropropyl group with carbon number 1 to 4, more preferably, methyl or phenyl group. The symbols a and b in the formula are numerals satisfying the relation described before. When the value of a is less than 0.2 or when the value of b is over 3, the cured coating film is more likely to yield cracks. When the value of a is over 2 and below 4 or when the value of b is 0.0001, the curing reaction does not progress.

These polyorganosiloxanes containing silanol groups can be obtained, for example, by hydrolyzing methyl trichlorosilane, dimethyl dichlorosilane, phenyl trichlorosilane, diphenyl trichlorosilane or a mixture of one or more of alkoxysilanes corresponding to these with a large amount of water by a known method. When hydrolyzation reaction is carried out by a known method in order to obtain the organosiloxane containing silanol groups, some alkoxisilanes may remain unhydrolyzed. Although this means that a polyorganosiloxane in which silanol groups and alkoxy groups coexist may be obtained in some cases, such a polyorganosilane can be used in this invention without causing any problems.

The weight average molecular weight of the polyorganosiloxane containing silanol groups, which is the component (D), is preferably in a range of 700 to 20,000 (as converted into polystyrene). When the molecular weight is lower than this range, toughness of the coating film becomes low so that the film tends to develop cracks. Meanwhile, when the molecular weight is higher than the range, the resin in the coating film tends to undergo phase separation so as to be whitened. Thus, either case is not preferable.

Preferably, the blending ratios of the component (A) and the component (B) are 1 to 99 parts by weight for (A) and 1 to 99 parts by weight for (B), more Preferably, 5 to 95 parts by weight for (A) and 5 to 95 parts by weight for (B), where the total of the ratios of the component (A) and the component (B) is 100 parts by weight. In this case also, when the ratio of the component (A) exceeds 99 parts by weight, cracks tend to develop in the coating film, while when the ratio is less than 1 part by weight, sufficient hardness of the coating film cannot be obtained.

When the coating resin composition further contains the component (D), the blending ratios of the component (A), the component (B) and the component (D) are preferably 1 to 94 parts by weight for (A), 5 to 50 parts by weight for (B), and 1 to 94 parts by weight for (D); more preferably, 20 to 94 parts by weight for (A), 5 to 50 parts by weight for (B), and 20 to 94 parts by weight for (D), where the total of the ratios of the components (A), (B) and (C) is 100 parts by weight. When the ratio of the component (A) exceeds 94 parts by weight, cracks tend to develop in the coating film, while when the ratio is less than 1 part by weight, sufficient hardness of the coating film cannot be obtained. When the ratio of the component (B) exceeds 50 parts by weight, weatherability of the coating film cannot be obtained, while when it is less than 5 parts by weight, sufficient toughness cannot be obtained.

The amount of addition of the component (C) is preferably 0.001 to 10 parts by weight on the basis of a total amount of 100 parts by weight of the component (A), the component (B), and the component (D) that is used when necessary. When the amount is less than 0.001 part by weight, the resin will not cure at ordinary temperature in some cases, while when the amount is over 10 parts by weight, the resin will deteriorate in heat resistance and weatherability in some cases.

The coating resin composition of the invention can be formed into a paint by adding pigments thereto. The pigments to be added are preferably organic pigments such as carbon black, quinacridone, naphthol red, cyanine blue, cyanine green or hanza yellow; or inorganic pigments such as titanium oxide, barium sulfate, rouge or complex metal oxides. One or more of the substances selected from these groups can be combined for use. Although the amount of addition of the pigment is not particularly limited because the masking property differs depending on the kind of the pigments, the preferable amount is 5 to 80 parts by weight on the basis of 100 parts by weight of the total solid fraction in the component (A) and the component (B), and the component (D) that is used when necessary. When the amount is less than 5 parts by weight, the masking property will be poor, while when the amount is more than 80 parts by weight, the coating film may be poor in smoothness. Dispersion of the pigment may be carried out by a conventional process. In this process, dispersing agents, dispersing aids, thickening agents, coupling agents, or the like may be used together.

The thickness of the coating film may be 0.1 to 100 μm without being particularly limited. However, it is preferably 1 to 50 μm in order that the coating film is maintained in stable adhesion for a long term without developing any cracks or peeling.

The coating resin composition of the invention can be applied for coating by conventional methods of application, where such various methods of application as brush painting, spraying, immersion, flow, roll, curtain or knife coating process may be selected. The ratio of dilution with organic solvents is not particularly limited and may be selected as required.

To the coating resin composition of the invention, leveling agents, thickening agents, pigments, dyes, aluminum paste, glass frit, metal powder, anti-oxidant or ultraviolet-absorbing agents may be added, as required, within such a range that it will not adversely affect the effects of the invention.

The coating resin composition of the invention is preferably applied as a two-part resin composition, where the following method (1), (2) or (3) are examined:
(1) A method being used by mixing a resin solution containing the component (A) and the component (B) with a resin solution containing the component (C);
(2) A method being used by mixing a resin solution containing the component (A) and the component (C) with a resin solution containing the component (B); or
(3) A method being used by mixing a resin solution containing the component (A) with a resin solution containing the component (B) and the component (C).

And in case that the coating resin composition of the invention further contains the component (D), this coating resin composition can be applied as another two-part resin composition, where the following method (4), (5) or (6):
(4) A method being used by mixing a resin solution containing the component (A), the component (B) and the component (C) with a resin solution containing the component (D);
(5) A method being used by mixing a resin solution containing the component (A) and the component (C) with a resin solution containing the component (B) and the component (D); or
(6) A method being used by mixing a resin solution containing the component (A), the component (B) and the component (C) with a resin solution containing the component (C) and the component (D).

In the method described in (1) to (6), although more concrete method of mixing each component is not particularly limited, in case of the method (4), a method which mixes a resin solution containing the component (A) with a resin solution containing the component (B) and then further mixes a resin solution containing the component (c) thereto, (where it is possible to accelerate the reaction by heating at 60° C.), further mixes a resin solution containing the component (D) into that, is examined. Incidentally, it is sufficient for mixing of each component to do by a known method such as using of a stirrer, however means of mixing thereof is not limited to these.

Further, the coating resin composition according to the present invention affords the following resin-coated article.

This resin-coated article comprises a cured resin layer of the coating resin composition according to the present invention on the surface of a substrate.

The thickness of the cured resin layer, although is not particularly limited, may be 0.1 to 100 $\mu$m. However, it is preferably 1 to 50 $\mu$m in order that the coating film is maintained in stable adhesion for a long term without developing any cracks or peeling.

The resin-coated article according to the present invention may comprises at least two resin layers on the surface of the substrate as the occasion demands. In this case, at least one of these resin layers is the cured resin layer of the coating resin composition according to the present invention. That is, all the resin layers mentioned above does not need to be the cured resin layer of the coating resin composition according to the present invention, the cured resin layer of the coating resin composition according to the present invention and a cured resin layer of a coating resin composition other than the present invention may be intermingled.

Usable coating resin compositions other than the present invention are not particularly limited but, for example, phthalic resin enamel (such as Unpack 200 made by Nihon Paint Co. Ltd. in Japan), polyurethane resin coating (such as Toa Urethane #100 made by Toupe Co. Ltd. in Japan), acrylic resin (such as AP Enamel made by Kansai Paint Co. Ltd. in Japan). These are used for a purpose such as protection of organic coating film poor in weatherability and low in hardness, provision of design for the cured resin layer of the coating resin composition according to the present invention by organic coating.

The thickness of the coating resin compositions other than the present invention, mentioned above, is not particularly limited but, preferably may be 0.1 to 100 $\mu$m, more preferably 1 to 50 $\mu$m. When the thickness is less than 0.1 $\mu$m, there are problem such as that the masking property will be poor, uniformity of coating film will hard to obtain, and the like. While when the thickness is more than 100 $\mu$m, there are problem such as that cracks will easily develop in coating film.

Preferably, the resin-coated article according to the present invention further comprises a primer layer as a first layer between the substrate and the resin layer (which is the most under layer, if number of the resin layer is the plurality.) in order to obtain high adhesion.

The thickness of the primer layer is not particularly limited but, preferably may be 0.1 to 50 $\mu$m, more preferably 0.1 to 10 $\mu$m. When the thickness is too thin, there are problem such as that uniformity of coating film will hard to obtain. While when the thickness is too thick, there is a fear of foaming during drying process.

The primer layer is, for example, a cured resin layer of a primer composition which contains, 10% by weight and more as a solid fraction, at least one selected from the group consisting of an epoxy resin, an acrylic resin, an acrylic silicone resin, a chlorinated rubber resin, an urethane resin, a phenolic resin, a polyester resin and a melamine resin.

The primer layer is not limited to what mentioned above. For example, the primer layer may be a cured resin layer of a primer composition which consists essentially of:
(a-1) 100 parts by weight of an isocyanate prepolymer containing at least of two isocyanate groups but no urethane bond in the one molecule;
(b-1) 1 to 100 parts by weight of an organic silicon compound containing at least one mercapto group and at least two alkoxy groups in the one molecule;
(c-1) 100 or less parts by weight of an epoxy-modified silicon resin; and
(d-1) 0.01 to 30 parts by weight of an organotin compound and/or a tin salt of organic acid.

In case it is required not to change color by light, the isocyanate groups contained in the component (a-1) are preferably not bonded to a benzene ring directly.

A concrete example of component (a-1) is examined, although not particularly limited, hexamethylenediisocyanate, tolylenediisocyanate, m-xylylenediisocyanate, tris(2-hydroxyethyl)isocyanate, and the like, further examined partial hydrolysis products or trimerizates of these, also examined reaction products of mixture of these isocyanates. Among of these, in terms of weatherability, what contains no urethane bond and is not bonded to a benzene ring directly is preferable in the present use. Examples of them are compounds such as shown in following formula (IV) or (V) having bullet bonds, or such as shown in following formula (VI), (VII), (VIII), or (IX) having isocyanurate rings. These are used singly, or are used in combination of the plural thereof.

Chemical formula

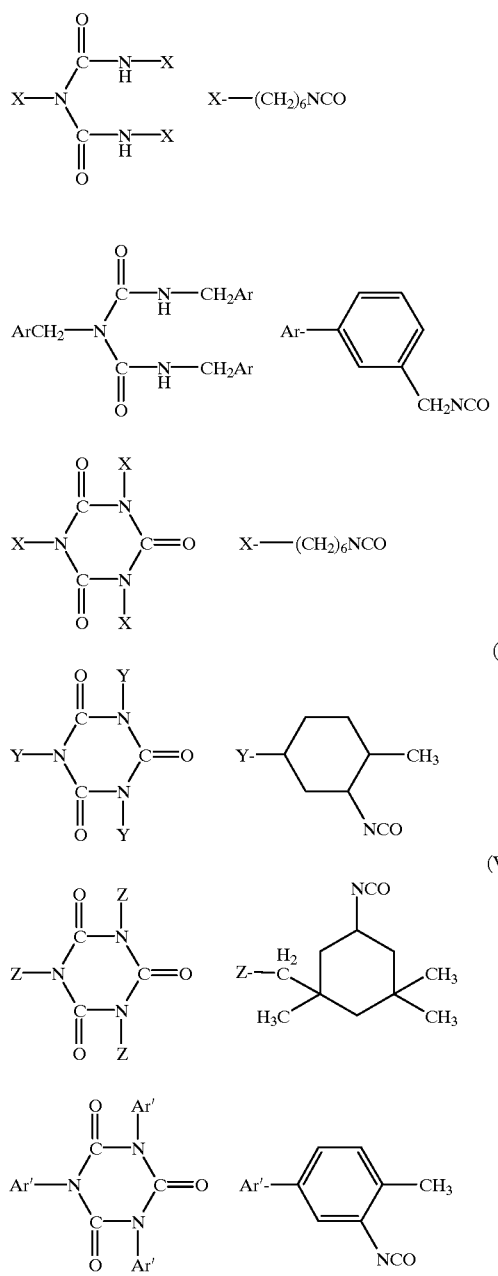

The organic silicon compound of the component (b-1) is a silane coupling agent which has mercapto groups reacting with organic compounds and alkoxy groups reacting with inorganic compounds, and acts as adhesion-improving agents. The organic silicon compound is, although not particularly limited, for example, a silane such as $HS(CH_2)_3Si(OCH_3)_3$, $HS(CH_2)_3Si(OC_2H_5)_3$, $HS(CH_2)_2Si(OCH_3)_3$, $HS(CH_2)_2Si(OC_2H_5)_3$, $HS(CH_2)_3Si(CH_2)(OCH_3)_2$, and the like, and hydrolyzate thereof. These may be used singly, or may be used in combination of the plural thereof.

The amount of blending of the organic silicon compound of the component (b-1) is 1 to 100 parts by weight, preferably 1 to 100 parts by weight, on the basis of the amount of 100 parts by weight of the isocyanate prepolymer of the component (a-1). When the blending ratio of the organic silicon compound is less than 1 parts by weight, sufficient adhesion is not shown, and also strength of coating film may be inferior, while when the blending ratio is more than 10 parts by weight, adhesion tends to lower on the contrary.

The epoxy-modified silicon resin of the component (c-1) contributes to improve adhesion and resistance to ultraviolet of the primer. The epoxy resin component is a low polymer or a polymer which contains a compound having oxirane oxygen such as glycidyl group, 3,4-oxycyclohexyl group, and the like. The epoxyresin component may be used every kind of acid anhydride, amine, and the like, as curing agent. These curing agent component is, although not particularly limited, for example, phthalic anhydride, maleic anhydride, hexahydrophthalic anhydride, pyromellitic acid anhydride, dodecylsuccinic acid anhydride, and the like. These may be used singly, or may be used in combination of the plural thereof.

The amount of blending of The epoxy-modified silicon resin of the component (c-1) is, as the solid content, 100 parts by weight and less, preferably 3 to 50 parts by weight, on the basis of the amount of 100 parts by weight of the isocyanate prepolymer of the component (a-1). The blending ratio of the epoxy-modified silicon resin being over 100 parts by weight may impair weatherability and adhesion, and also is unfavorable in terms of stability of the primer resin.

The organotin compound and/or the tin salt of organic acid of the component (d-1) functions as reaction catalyst for other contents containing in the primer such as isocyanate groups, alkoxysilyl groups, silanol groups. Such the tin compound is, although not particularly limited, for example, tin carboxylates such as tin octoate; organotin carboxylates such as dibutyltin acetate, dibutyltin laurate, dibutyltin maleate or dibutyltin phthalate; deesterification reaction products of these compounds and alkoxysilanes such as tetramethoxysilane or tetraethoxysilane; reaction products of organotin oxides such as dibutyltin oxide or ester thereof; and the like.

The amount of blending of the component (d-1) is 0.01 to 30 parts by weight, preferably 0.05 to 10 parts by weight, on the basis of the amount of 100 parts by weight of the isocyanate prepolymer of the component (a-1). When the amount of blending of the component (d-1) is less than 0.01 parts by weight, adhesion, especially adhesion water resistance may lower, while when the amount of blending is more than 30 parts by weight, there is a tendency to cause problems in workability of coating, because of the rate of cure of the primer composition becomes too large.

The primer composition consisting essentially of every component mentioned above is appropriately diluted by organic solvents, in order to ease working of coating, and also for the purpose of giving shelf stability. Such the solvent is, although not particularly limited, for example, carboxylates such as ethyl acetate or butyl acetate; ketones such as acetone or methylethyl ketone; aromatic compounds such as toluene, xylene or benzene; ethers such as diethyl ether, tetrahydrofuran or dioxane; and heterocyclic compounds containing oxygen. These solvents may be used singly, or may be used in combination of the plural thereof.

Also, the primer layer is not limited to what mentioned above. For example, the primer layer may be a cured resin layer of a primer composition which consists essentially of:

(a-2) 100 parts by weight of a hydrolyzable-group-containing vinyl copolymer prepared by copolymerizing 99.5 to 75 mol % of an ethylene-type monomer and an unsaturated-group-containing silicon compound represented by a general formula $RSiX_mR'_{(3-m)}$ (wherein R is an univalent hydrocarbon group containing a vinyl group, R' is an univalent hydrocarbon group having a carbon number of 1 to 10, X is a hydrolyzable functional group selected from the group consisting of an alkoxyl group having a carbon number of 1 to 4, an alkoxyalkoxyl group having a carbon number of 2 to 6, and an oxime group having a carbon number of 2 to 4, m is an integer of 1 to 3); and (b-2) 0.1 to 50 parts by weight of an epoxy-modified silicon resin.

The ethylene-type monomer being raw material of the component (a-2) is, although not particularly limited, for example, alkyl acrylates (methacrylates) such as methyl acrylate, methyl methacrylate, ethyl acrylate, ethyl methacrylate, propyl acrylate, propyl methacrylate, butyl acrylate, butyl methacrylate, hexyl acrylate, hexyl methacrylate or 2-ethylhexyl acrylate; conjugated dienes such as styrene, vinyltoluene or α-methylstyrene; vinyl esters of saturated fatty acid having a carbon number of 1 to 12 such as vinyl acetate or vinyl prorionate; and the like.

In the unsaturated-group-containing silicon compound being another raw material of the component (a-2) and represented by a general formula $RSiX_mR'_{(3-m)}$, examples of the univalent hydrocarbon group R containing a vinyl group, which is recommended in terms of readiness of synthesis or high availability of raw material, are vinyl, aryl, 3-acryloxypropyl, 3-methacryloxypropyl, p-vinylphenyl, and the like. Examples of the hydrolyzable functional group X are alkoxy groups having a carbon number 1 to 4 such as methoxy, ethoxy, p-propoxy or n-butoxy; alkoxyalkoxyl groups having a carbon number 2 to 6 such as methoxyethoxyl or ethoxyethoxyl; acyloxy such as acetoxy; oxime groups having a carbon number 2 to 4 such as methylethylketoxime; and the like. The number m in the hydrolyzable functional group X is selected from then integer 1 to 3, preferably is 2 or 3 in means of being formed network structure within a short time, and more preferably is 3. Concrete examples of these unsaturated-group-containing silicon compound is, although not particularly limited, for example, vinyltrimethoxysilane, vinyltriethoxysilane, vinyltris(ethoxyethoxy)silane, vinyltris(methylethylketoxime)silane, aryltrimethoxysilane, aryltriethoxysilane, aryltris(methylethylketoxime)silane, 3-acryloxypropyltrimethoxysilane, 3-acryloxypropyltris(ethoxyethoxy)silane, 3-acryloxypropyltris(methylethylketoxime)silane, 3-methacryloxypropyl(ethoxyethoxy)silane, 3-methacryloxypropyl(methylethylketoxime)silane, and the like.

The hydrolyzable-group-containing vinyl copolymer of the component (a-2), for example, is obtained by allowing to react the ethylene-type monomer and the unsaturated-group-containing silicon compound which mentioned above, under a condition such as at temperature of 50 to 150° C. under the presence of organic solvent and a free-radical initiator. The free-radical initiator is, although not particularly limited, for example, azo compounds or organic peroxides, concretely such as azobisisobutylonitrile, t-butyl hydroperoxide, cumene hydroperoxide, di-t-butyl peroxide, dicumyl peroxide, benzoyl peroxide, t-butyl perbenzoate, acetone peroxide, and the like. The amount of the free-radical initiator is, although not particularly limited, suitable for the range of 0.01 to 1% by weight on the basis of a total amount of the ethylene-type monomer and the unsaturated-group-containing silicon compound. When this polymerization is done, it is possible to control a molecular weight by using chain transfer agents such as n-propanethiol, 1-hexanethiol, 1-decanethiol, benzenethiol, 3-mercaptpropyltrimethoxysilane or 3-mercaptpropyltriethoxysilane.

Desirably the ratio of the ethylene-type monomer and the unsaturated-group-containing silicon compound is 99.5 to 75 mol % for the ethylene-type monomer and 0.5 to 25 mol % for the unsaturated-group-containing silicon compound. When the amount of using of the unsaturated-group-containing silicon compound is less than this range, weatherability of coating film lowers, which is not preferable. While when the amount of using is more than this range, the primer layer becomes brittle, which is not preferable.

The epoxy-modified silicon resin of the component (b-2) is although not particularly limited, for example, the same as the epoxy-modified silicon resin of the component (c-1). The amount of using of the epoxy-modified silicon resin is desirably 0.1 to 50 parts by weight as the solid content, on the basis of the amount of 100 parts by weight of the hydrolyzable-group-containing vinyl copolymer of the component (a-2). In case that the amount of using is less than 0.1 to parts by weight, there is a fear of being bad for weatherability and toughness of coating film, while in case that the amount of using is more than 50 parts by weight, adhesion may lower, which is not preferable.

The primer composition containing the component (a-2) and the component (b-2) may further contain a curing catalyst, as the occasion demands. The amount of using of the curing catalyst is desirably less than 20 parts by weight on the basis of the amount of 100 parts by weight of the hydrolyzable-group-containing vinyl copolymer. When the amount of using is more than 20 parts by weight, the curing catalyst oozes out on the surface of the primer film so that adhesion is hindered, which is not preferable. Concrete examples of the curing catalyst is, although not particularly limited, metallic salts of carboxylic acid such as dibutyltin laurate, dibutyltin acetate, dibutyltin tri(2-hexoate), stannous caprylate, tin naphthenate, tin oleate, iron 2-ethylhexoate, lead 2-ethyloctoate, cobalt 2-ethylhexoate, manganese 2-ethylhexoate, zinc 2-ethylhexoate, titanium naphthenate, zinc naphthenate, cobalt naphthenate or zinc stearate; organic titanate such as tetrabutyl titanate or tetra (isopropenyloxy) titanate; organotitanium compounds such as organosiloxytitanium or β-carbonyltitanium; aminoalkyl group-substituted alkoxysilanes such as γ-aminopropyltriethoxysilane or N-(trimethoxysirylpropyl) ethylenediamine; amine compounds or salts thereof such as hexylamine or dodecylamine phosphate; quaternary ammonium salts such as benzentriethylammonium acetate; lower fatty acid salts of alkali metal such as potassium acetate, sodium acetate or lithium oxalate; dialkylhydroxylamines such as dimethylhydroxylamine or diethylhydroxylamine; guanidine compounds such as tetramethylguanidine; guanidine-group-containing silane or siloxane compounds; and the like.

Either of the primer composition which described above may further contain, as the occasion demands, other additional agents like coloring pigments such as titanium oxide, carbon black, iron oxide, and the like. A method of application of the primer composition is not particularly limited but, for example, brush painting, spraying, roll coater or flow coater can be used. Then, the thickness of the coating film is preferably 0.5 to 10 μm. Although a method of drying and curing is not particularly limited, for example, treating in drying oven at temperature of 80° C. during 10 to 20 minutes can be applied.

At least one of the resin layer may be a cured resin layer with a pattern formed by a divisional coating and/or a wet-on-wet coating of a resin composition containing at least two pigments.

At least one of the resin layer may be a cured resin layer of the coating resin composition containing at least one of a pigment, and then, on this cured resin layer of the coating resin composition, a cured resin layer of the coating resin composition not containing any pigments may be formed.

The resin-coated article according to the present invention may being done at least one of processings selected from the bending, a drawing, a punching, a boring, a cutting, and a pressing.

Next, a method for producing of the resin-coated article according to the present invention are described.

This method for producing of the resin-coated article according to the present invention comprises a step of forming at least one resin layer on the surface of a substrate. At least one the resin layer is formed by curing the coating resin composition according to the present invention after coating the coating resin composition on the surface of the substrate.

The method for producing of the resin-coated article according to the present invention may further comprises a step of forming a primer layer as a first layer on the surface of the substrate.

The method for producing of the resin-coated article may be done a adjustment of scattering of suction on the surface of the substrate by sealing the surface of the substrate with solvent-soluble, water-soluble or emulsion sealers according to a kind of the substrate, in preference to form the primer layer. The sealers being used are not particularly limited but, for example, acrylic or latex sealers can be used.

The method for producing of a resin-coated article according to the present invention may further comprises a step of doing at least one of processings selected from the bending, a drawing, a punching, a boring, a cutting, and a pressing, after forming the primer layer and/or the resin layer on the surface of the substrate.

The method for producing of a resin-coated article according to the present invention may further comprises a step of at least one resin layer after doing the processings.

Next, the substrate used in the present invention are described.

Concrete examples of the substrate is, although not particular limited, for example, plastics such as polycarbonate resin, acrylic resin or ABS resin; steels such as stainless or iron; glasses; woods; papers; wall materials such as cement or plaster; inorganic curing bodies; ceramics such as alumina; and the like. Further, the coating resin composition according to the present invention may be used, in spite of the substrate, in use of surface protection of coatings consisting of acrylic, alkyd, polyester, epoxy, or urethane coating.

Concrete examples of the inorganic curing bodies are given in what follows.

Inorganic hang-up materials having hydraulic property which are the raw material of the inorganic curing bodies are not particular limited but, for example, one or more kinds selected from portland cement, blast furnace cement, blast furnace slug, calcium silicate, gypsum, and the like, are useable.

The inorganic hang-up materials are usually blended with inorganic fillers, fiber materials, and the like. They are not particular limited but, the inorganic fibers can be selected from fly ash, micro silica, silica sand, and the like; while the fiber materials can be selected from pulp, synthetic fiber, inorganic fibers such as asbestos, fibers such as metal fiber, and the like; and then, they are used singly or mixing more together.

The raw material of the inorganic curing bodies made up like this could form by processes such as extrusion molding, casting, paper making or pressing, since then, that is, although not particular limited, suitable to cure by autoclave setting, steam setting, cold setting, and the like.

Preferably the inorganic curing bodies being obtained has bulk density of 0.5 g/cm$^3$ and more, and dimensional change of 0.5% and less under a condition changing from the saturated-water-containing to the absolute drying, more preferably, that is selected what has bulk density of 0.7 g/cm$^3$ and more, and dimensional change of 0.4% and less. When the density being is less than 0.5 g/cm$^3$, suction of the primer composition and the coating resin composition of the invention is so extreme that adhesive property is hard to demonstrate, besides appearance of coating film is liable to become bad.

The inorganic curing bodies may have a tongue processed portion and/or a uneven design as the occasion demands. Examples of the inorganic curing bodies like this is what is processed at sizes (unit is mm) and shapes shown in FIGS. 1 and 2, but is not limited to this.

EXAMPLES

Concrete examples of the invention and comparative examples will be described below, but the invention is not limited to the following examples. The terms "part" and "%" that appear throughout the following description all denote "parts by weight" and "% by weight", respectively.

First, examples of the process for preparing the component (A) are described.

Preparation Example A-1

In a flask equipped with a stirrer, a heating jacket, a condenser and a thermometer, were placed 100 g of IPA-ST (colloidal silica sol dispersed in isopropanol: particle size 10 to 20 nm, solid fraction 30%, water content 0.5%, made by Nissan Kagaku Kogyo Co. Ltd. in Japan), 68 g of methyl trimethoxysilane and 10.8 g of water. These were hydrolyzed at 65° C. for 5 hours with stirring and then cooled, by which a component (A) was obtained. The product had a solid fraction of 36% after being allowed to stand at room temperature for 48 hours. The component (A) obtained by this process is referred to as A-1.

Preparation Conditions of A-1:

Moles of water to 1 mole of hydrolyzable functional group: 0.1

Silica content of the component (A): 47.3%

Mol % of hydrolyzable organosilane with n=1: 100 mol %

Preparation Example A-2

In a flask equipped with a stirrer, a heating jacket, a condenser and a thermometer, were placed 100 g of XBA-ST (colloidal silica sol dispersed in methanol: particle size 10 to 20 nm, solid fraction 30%, water content 0.5%, made by Nissan Kagaku Kogyo Co. Ltd. in Japan), 68 g of methyl trimethoxysilane, 49.5 g of phenyl trimethoxysilane, 16.0 g of water and 0.1 g of acetic anhydride. These were hydrolyzed at 60° C. for 5 hours with stirring and then cooled, by which a component (A) was obtained. The product had a solid fraction of 41% after being allowed to stand at room temperature for 48 hours. The component (A) obtained by this process is referred to as A-2.

Preparation Conditions of A-2:
  Moles of water to 1 mole of hydrolyzable functional group: 0.4
  Silica content of the component (A): 31.3%
  Mol % of hydrolyzable organosilane with n=1: 100 mol %

The process of preparing the component (B) is as follows:

Preparation Example B-1

In a flask equipped with a stirrer, a heating jacket, a condenser, a dropping funnel, a nitrogen-gas intake/discharge hole, and a thermometer, was placed a reaction solution in which 5.69 g (40 mmol) of n-butyl methacrylate (BMA), 1.24 g (5 mmol) of trimethoxysilylpropyl methacrylate (SMA) and 0.71 g (5 mmol) of glycidyl methacrylate (GMA), and further 0.784 g (4 mmol) of γ-mercaptopropyl trimethoxysilane as a chain transfer agent had been dissolved in 8.49 g of toluene, and a solution in which 0.025 g (0.15 mmol) of azobisisobutyronitrile had been dissolved in 3 g of toluene was added dropwise under nitrogen stream. The mixture was allowed to react at 70° C. for 2 hours. A polymer with a weight average molecular weight of 1,000 was obtained and this acrylic resin solution was used as the component (B) per se. This product is referred to as B-1. The molecular weight was determined as a value converted into that of the standard polystyrene, by gel permeation chromatography (measuring instrument model: HLC-802UR, made by Toso Co. Ltd. in Japan). The molecular weights that appear hereinafter was measured in the same manner.

Preparation Conditions of B-1:
  Monomer molar ratio: BMA/SMA/GMA=8/1/1
  Weight average molecular weight: 1,000
  Solid fraction content: 40%

Preparation Example B-2

By the same procedure as in the preparation example B-1, into a reaction solution in which 4.98 g (35 mmol) of n-butylmethacrylate (BMA), 2.48 g (10 mmol) of trimethoxysilyl-propyl methacrylate (SMA), 0.71 g (5 mmol) of glycidyl methacrylate (GMA) and 0.784 g (4 mmol) of γ-mercaptopropyl trimethoxy-silane had been dissolved in 9.26 g of toluene, a solution in which 0.025 g (0.15 mmol) of azobisisobutylonitrile had been dissolved in 3 g of toluene was added dropwise so that the mixture was allowed to react. The product is referred to as B-2.

Preparation Conditions of B-2:
  Molar ratio of the monomers: BMA/SMA/GMA=7/2/1
  Weight average molecular weight: 1,000
  Solid fraction content: 40%

Preparation Example B-3

By the same procedure as in the preparation example B-1, into a reaction solution in which 4.27 g (30 mmol) of n-butylmethacrylate (BMA), 3.73 g (15 mmol) of trimethoxysilyl-propyl methacrylate (SMA), 0.71 g (5 mmol) of glycidyl methacrylate (GMA) and 0.784 g (4 mmol) of γ-mercaptopropyl trimethoxy-silane had been dissolved in 10.10 g of toluene, a solution in which 0.025 g (0.15 mmol) of azobisisobutylonitrile had been dissolved in 3 g of toluene was added dropwise so that the mixture was allowed to react. The product is referred to as B-3.

Preparation Conditions of B-3:
  Molar ratio of the monomers: BMA/SMA/GMA=6/3/1
  Weight average molecular weight: 1,000
  Solid fraction content: 40%

Preparation Example B-4

By the same procedure as in the preparation example B-1, into a reaction solution in which 3.56 g (25 mmol) of n-butylmethacrylate (BMA), 4.97 g (20 mmol) of trimethoxysilyl-propyl methacrylate (SMA), 0.71 g (5 mmol) of glycidyl methacrylate (GMA) and 0.784 g (4 mmol) of γ-mercaptopropyl trimethoxy-silane had been dissolved in 10.90 g of toluene, a solution in which 0.025 g (0.15 mmol) of azobisisobutylonitrile had been dissolved in 3 g of toluene was added dropwise so that the mixture was allowed to react. The product is referred to as B-4.

Preparation Conditions of B-4:
  Molar ratio of the monomers: BMA/SMA/GMA=5/4/1
  Weight average molecular weight: 1,000
  Solid fraction content: 40%

Preparation Example B-5

By the same procedure as in the preparation example B-1, into a reaction solution in which 2.84 g (20 mmol) of n-butylmethacrylate (BMA), 6.21 g (25 mmol) of trimethoxysilyl-propyl methacrylate (SMA), 0.71 g (5 mmol) of glycidyl methacrylate (GMA) and 0.784 g (4 mmol) of γ-mercaptopropyl trimethoxy-silane had been dissolved in 11.68 g of toluene, a solution in which 0.025 g (0.15 mmol) of azobisisobutylonitrile had been dissolved in 3 g of toluene was added dropwise so that the mixture was allowed to react. The product is referred to as B-5.

Preparation Conditions of B-5:
  Molar ratio of the monomers: BMA/SMA/GMA=4/5/1
  Weight average molecular weight: 1,000
  Solid fraction content: 40%

Preparation Example B-6

By the same procedure as in the preparation example B-1, into a reaction solution in which 2.13 g (15 mmol) of n-butylmethacrylate (BMA), 7.45 g (30 mmol) of trimethoxysilyl-propyl methacrylate (SMA), 0.71 g (5 mmol) of glycidyl methacrylate (GMA) and 0.784 g (4 m-mol) of γ-mercaptopropyl trimethoxy-silane had been dissolved in 12.47 g of toluene, a solution in which 0.025 g (0.15 mmol) of azobisisobutylonitrile had been dissolved in 3 g of toluene was added dropwise so that the mixture was allowed to react. The product is referred to as B-6.

Preparation Conditions of B-6:
  Molar ratio of the monomers: BMA/SMA/GMA=3/6/1
  Weight average molecular weight: 1,000
  Solid fraction content: 40%

Preparation Example B-7

By the same procedure as in the preparation example B-1, into a reaction solution in which 1.42 g (10 mmol) of n-butylmethacrylate (BMA), 8.69 g (35 mmol) of trimethoxysilyl-propyl methacrylate (SMA), 0.71 g (5 mmol) of glycidyl methacrylate (GMA) and 0.784 g (4 mmol) of γ-mercaptopropyl trimethoxy-silane had been dissolved in 13.27 g of toluene, a solution in which 0.025 g (0.15 mmol) of azobisisobutylonitrile had been dissolved in 3 g of toluene was added dropwise so that the mixture was allowed to react. The product is referred to as B-7.

Preparation Conditions of B-7:
 Molar ratio of the monomers: BMA/SMA/GMA=2/7/1
 Weight average molecular weight: 1,000
 Solid fraction content: 40%

Preparation Example B-8

By the same procedure as in the preparation example B-1, into a reaction solution in which 0.711 g (5 mmol) of n-butylmethacrylate (BMA), 9.93 g (40 mmol) of trimethoxysilyl-propyl methacrylate (SMA), 0.71 g (5 mmol) of glycidyl methacrylate (GMA) and 0.784 g (4 mmol) of γ-mercaptopropyl trimethoxy-silane had been dissolved in 14.06 g of toluene, a solution in which 0.025 g (0.15 mmol) of azobisisobutylonitrile had been dissolved in 3 g of toluene was added dropwise so that the mixture was allowed to react. The product is referred to as B-8.
Preparation Conditions of B-8:
 Molar ratio of the monomers: BMA/SMA/GMA=1/8/1
 Weight average molecular weight: 1,000
 Solid fraction content: 40%

Comparative Preparation Example B'-1

By the same procedure as in the preparation example B-1, into a reaction solution in which 7.11 g (50 mmol) of n-butylmethacrylate (BMA), 0 g (0 mmol) of trimethoxysilyl-propyl methacrylate (SMA), 0 g (0 mmol) of glycidyl methacrylate (GMA) and 0.784 g (4 mmol) of γ-mercaptopropyl trimethoxy-silane had been dissolved in 7.7 g of toluene, a solution in which 0.025 g (0.15 mmol) of azobisisobutylonitrile had been dissolved in 3 g of toluene was added dropwise so that the mixture was allowed to react. The product is referred to as a comparative component B'-1.
Preparation Conditions of B'-1:
 Molar ratio of the monomers: BMA/SMA/GMA=10/0/0
 Weight average molecular weight: 1,000
 Solid fraction content: 40%

Comparative Preparation Example B'-2

By the same procedure as in the preparation example B-1, into a reaction solution in which 0 g (0 mmol) of n-butylmethacrylate (BMA), 12.4 g (50 mmol) of trimethoxysilyl-propyl methacrylate (SMA), 0 g (0 mmol) of glycidyl methacrylate (GMA) and 0.784 g (4 mmol) of γ-mercaptopropyl trimethoxy-silane had been dissolved in 15.6 g of toluene, a solution in which 0.025 g (0.15 mmol) of azobisisobutylonitrile had been dissolved in 3 g of toluene was added dropwise so that the mixture was allowed to react. The product is referred to as a comparative component B'-2.
Preparation Conditions of B'-2:
 Molar ratio of the monomers: BMA/SMA/GMA=0/10/0
 Weight average molecular weight: 1,000
 Solid fraction content: 40%

Comparative Preparation Example B'-3

By the same procedure as in the preparation example B-1, into a reaction solution in which 0 g (0 mmol) of n-butylmethacrylate (BMA), 0 g (0 mmol) of trimethoxysilyl-propyl methacrylate (SMA), 7.1 g (50 mmol) of glycidyl methacrylate (GMA) and 0.784 g (4 mmol) of γ-mercaptopropyl trimethoxy-silane had been dissolved in 7.65 g of toluene, a solution in which 0.025 g (0.15 mmol) of azobisisobutylonitrile had been dissolved in 3 g of toluene was added dropwise so that the mixture was allowed to react. The product is referred to as a comparative component B'-3.
Preparation Conditions of B'-3:
 Molar ratio of the monomers: BMA/SMA/GMA=0/0/10
 Weight average molecular weight: 1,000
 Solid fraction content: 40%

Next, examples for preparing the component (D) are described below.

Preparation Example D-1

In a flask equipped with a stirrer, a heating jacket, a condenser, a dropping funnel and a thermometer, was placed a solution of 220 g (1 mol) of methyltriisopropoxy silane with 150 g of toluene, and 108 g of a 1% aqueous solution of hydrochloric acid was added into the mixed solution in 20 minutes to hydrolyze methyltripropoxy silane. Stirring was stopped 40 minutes after the dropwise addition and, out of two separated layers, the lower layer of a mixed solution of water and isopropyl alcohol containing a small amount of hydrochloric acid was separated. The left resin solution of toluene had the remaining hydrochloric acid removed by washing with water, and besides toluene evaporated off in vacuo, and then diluted with isopropyl alcohol. Thus, a 40% isopropyl alcohol solution of an organopolysiloxane containing silanol groups with weight average molecular weight about 2,000 was obtained. This product is referred to as D-1.

Preparation Example D-2

In a flask equipped with a stirrer, a heating jacket, a condenser, a dropping funnel and a thermometer, were placed 1,000 g of water and 50 g of acetone, and further a solution in which 44.8 g (0.3 mol) of methyltrichlorosilane and 84.6 g (0.4 mol) of phenyltrichlorosilane had been dissolved in 200 g of toluene was added dropwise with stirring so that hydrolysis was effected. Stirring was stopped 40 minutes after the dropwise addition and the reaction solution was moved into a separating funnel and allowed to stand still. Thereafter, out of two separated layers, the lower-layer hydrochloric acid solution was separated and removed. Next, water and hydrochloric acid remaining in the upper-layer toluene solution of organopolysiloxane was removed by reduced-pressure stripping together with excess toluene. Thus, a toluene 60% solution of organopolysiloxane containing silanol groups with weight average molecular weight about 3,000 was obtained. This product is referred to as D-2.

Examples 1 to 20 and Comparative Examples 1 to 8

Coating resin compositions as clear paints

Components shown in Tables 1 to 4 were mixed in the ratios listed in the tables and diluted with isopropyl alcohol so that the solid fraction would be 25% in every case, by which coating resin compositions were obtained. The coating resin compositions obtained were applied by spray coating onto aluminum-flame-sprayed test pieces (trade name: Alstar, made by Nihon Test Panel Co. Ltd.; size 150 mm×70 mm×0.3 mm) so that the coating film would have a film thickness of 30 μm after curing. By a 20 minute curing process at a curing temperature of 100° C., coating films were formed and tested for coating film characteristics. The coating film characteristic test was conducted by the following evaluation criteria:

Adhesion: Adhesive property to the substrate was evaluated by a pealing test using checkered adhesive tape (cellophane tape);

Hardness of coating film: By a pencil hardness test (pursuant to JIS K5400);

Solvent resistance: The coating film was lightly pressed with a sheet of gauze dipped with toluene, and rubbed 100 times in reciprocation. By observing the state of the coating film during this process, those which had remained unchanged were taken as successfully cured.

Boiling water resistance: After placing the test piece in boiling city water for 16 hours, it was left at room temperature for 1 hour. By observing the state of the coating film, those which had remained unchanged were taken as good.

Weatherability: After a 2500 hour irradiation by a sunshine weatherometer (pursuant to JIS K5400), the coating film was observed and those which had remained unchanged were taken as good.

As seen in Tables 1 to 4, the coating resin compositions of Examples showed that their coating films were good in every aspect of the adhesion, coating film hardness, solvent resistance, boiling water resistance and weatherability, as compared with those of Comparative Examples.

Examples 21 to 28 and Comparative Examples 9 to 16

Coating resin compositions as clear paints

Components shown in Tables 5 to 7 were mixed in the ratios listed in the tables and diluted with isopropyl alcohol so that the solid fraction would be 25% in every case, by which coating resin compositions were obtained. The method of fabricating coating films and the method of evaluating the coating films were the same as in the cases shown in Tables 1 to 4. New methods for preparing the component (B) are shown below:

Preparation Example B-9

By the same procedure as in the preparation example B-1, into a reaction solution in which 5.69 g (40 mmol) of n-butylmethacrylate (BMA), 1.24 g (5 mmol) of trimethoxysilyl-propyl methacrylate (SMA), 0.71 g (5 mmol) of glycidyl methacrylate (GMA) and 0.196 g (1 mmol) of γ-mercaptopropyl trimethoxy-silane had been dissolved in 8.49 g of toluene, a solution in which 0.025 g (0.15 mmol) of azobisisobutylonitrile had been dissolved in 3 g of toluene was added dropwise so that the mixture was allowed to react. The product is referred to as B-9.

Preparation Conditions of B-9:

Molar ratio of the monomers: BMA/SMA/GMA=8/1/1

Weight average molecular weight: 3,000

Solid fraction content: 40%

Preparation Example B-10

By the same procedure as in the preparation example B-1, into a reaction solution in which 5.69 g (40 mmol) of n-butylmethacrylate (BMA), 1.24 g (5 mmol) of trimethoxysilyl-propyl methacrylate (SMA), 0.71 g (5 mmol) of glycidyl methacrylate (GMA) and 0.098 g (0.5 mmol) of γ-mercaptopropyl trimethoxy-silane had been dissolved in 8.49 g of toluene, a solution in which 0.025 g (0.15 mmol) of azobisisobutylonitrile had been dissolved in 3 g of toluene was added dropwise so that the mixture was allowed to react. The product is referred to as B-10.

Preparation Conditions of B-10:

Molar ratio of the monomers: BMA/SMA/GMA=8/1/1

Weight average molecular weight: 5,000

Solid fraction content: 40%

Preparation Example B-11

By the same procedure as in the preparation example B-1, into a reaction solution in which 5.69 g (40 mmol) of n-butylmethacrylate (BMA), 1.24 g (5 mmol) of trimethoxysilyl-propyl methacrylate (SMA), 0.71 g (5 mmol) of glycidyl methacrylate (GMA) and 0.0392 g (0.2 mmol) of γ-mercaptopropyl trimethoxy-silane had been dissolved in 8.49 g of toluene, a solution in which 0.025 g (0.15 mmol) of azobisisobutylonitrile had been dissolved in 3 g of toluene was added dropwise so that the mixture was allowed to react. The product is referred to as B-11.

Preparation Conditions of B-11:

Molar ratio of the monomers: BMA/SMA/GMA=8/1/1

Weight average molecular weight: 12,000

Solid fraction content: 40%

Preparation Example B-12

By the same procedure as in the preparation example B-1, into a reaction solution in which 5.69 g (40 mmol) of n-butylmethacrylate (BMA), 1.24 g (5 mmol) of trimethoxysilyl-propyl methacrylate (SMA), 0.71 g (5 mmol) of glycidyl methacrylate (GMA) and 0 g (0 mmol) of γ-mercaptopropyl trimethoxy-silane had been dissolved in 8.49 g of toluene, a solution in which 0.025 g (0.15 mmol) of azobisisobutylonitrile had been dissolved in 3 g of toluene was added dropwise so that the mixture was allowed to react. The product is referred to as B-12.

Preparation conditions of B-12:

Molar ratio of the monomers: BMA/SMA/GMA=8/1/1

Weight average molecular weight: 36,000

Solid fraction content: 40%

Comparative Preparation Example B'-4

By the same procedure as in the preparation example B-1, into a reaction solution in which 3.56 g (25 mmol) of n-butylmethacrylate (BMA), 6.20 g (25 mmol) of trimethoxysilyl-propyl methacrylate (SMA), 0 g (0 mmol) of glycidyl methacrylate (GMA) and 0.784 g (4 mmol) of γ-mercaptopropyl trimethoxy-silane had been dissolved in 11.6 g of toluene, a solution in which 0.025 g (0.15 mmol) of azobisisobutylonitrile had been dissolved in 3 g of toluene was added dropwise so that the mixture was allowed to react. The product is referred to as B'-4.

Preparation Conditions of B'-4:

Molar ratio of the monomers: BMA/SMA/GMA=5/5/0

Weight average molecular weight: 1,000

Solid fraction content: 40%

Comparative Preparation Example B'-5

By the same procedure as in the preparation example B-1, into a reaction solution in which 3.56 g (25 mmol) of n-butylmethacrylate (BMA), 0 g (0 mmol) of trimethoxysilyl-propyl methacrylate (SMA), 3.55 g (25 mmol) of glycidyl methacrylate (GMA) and 0.784 g (4 mmol) of γ-mercaptopropyl trimethoxy-silane had been dissolved in 7.7 g of toluene, a solution in which 0.025 g (0.15 mmol) of azobisisobutylonitrile had been dissolved in 3 g of toluene was added dropwise so that the mixture was allowed to react. The product is referred to as B'-5.

Preparation Conditions of B'-5:

Molar ratio of the monomers: BMA/SMA/GMA=5/0/5

Weight average molecular weight: 1,000

Solid fraction content: 40%

Comparative Preparation Example B'-6

By the same procedure as in the preparation example B-1, into a reaction solution in which 0 g (0 mmol) of n-butylmethacrylate (BMA), 6.20 g (25 mmol) of trimethoxysilyl-propyl methacrylate (SMA), 3.55 g (25 mmol) of glycidyl methacrylate (GMA) and 0.784 g (4 mmol) of γ-mercaptopropyl trimethoxy-silane had been dissolved in 11.6 g of toluene, a solution in which 0.025 g (0.15 mmol) of azobisisobutylonitrile had been dissolved in 3 g of toluene was added dropwise so that the mixture was allowed to react. The product is referred to as B'-6.

Preparation Conditions of B'-6:

Molar ratio of the monomers: BMA/SMA/GMA=0/5/5

Weight average molecular weight: 1,000

Solid fraction content: 40%

As seen in Tables 5 to 7, the coating resin compositions of Examples showed that their coating films were good in every aspect of the adhesion, coating film hardness, solvent resistance, boiling water resistance and weatherability, as compared with those of Comparative Examples.

Examples 29 to 38 and Comparative Examples 17 to 20

(Coating resin compositions containing pigments)

By using components listed in Tables 8 to 9, a mixture of pigments composed of 100 g of white-pigment titanium oxide (R-820, made by Ishihara Sangyo Co. Ltd. in Japan) and 1 g of rouge (made by Toda Kogyo Co. Ltd. in Japan) was dispersed into 90 g of the component (A) with a grain mill. The component (A) and the component (B) were further added into this mixture so as to form a composition with a weight ratio of component (A): component (B): pigment=10:4:10. This ratio is equivalent to a solid fraction ratio of 18:8:50. Further, the component (C) and the component (D) were added in amounts listed in Tables 8 to 9, by which coating solutions were prepared. Then, the coating solutions were diluted with isopropyl alcohol so that the solid fraction would be 25% in every case, by which coating resin compositions were formed and tested for coating film characteristics, as in the cases shown in Tables 1 to 4. In this test, in addition to the evaluation methods as already described, gloss was evaluated by a glossimeter (with full scale 60 gloss).

As seen in Tables 8 to 9, the coating resin compositions of Examples showed that their coating films were good in every aspect of the adhesion, coating film hardness, solvent resistance, boiling water resistance, weatherability and gloss, as compared with those of Comparative Examples.

TABLE 1

| | | | Ex. 1 | Ex. 2 | Ex. 3 | Ex. 4 | Ex. 5 | Ex. 6 | Ex. 7 |
|---|---|---|---|---|---|---|---|---|---|
| Formulation of coating resin composition (parts) | Component A | A-1 | 50 | 50 | — | — | 50 | 50 | 50 |
| | | A-2 | — | — | 50 | 50 | — | — | — |
| | Component B | B-1 | 20 | 20 | 20 | 20 | — | — | — |
| | | B-2 | — | — | — | — | 20 | — | — |
| | | B-3 | — | — | — | — | — | 20 | — |
| | | B-4 | — | — | — | — | — | — | 20 |
| | | B-5 | — | — | — | — | — | — | — |
| | | B-6 | — | — | — | — | — | — | — |
| | | B-7 | — | — | — | — | — | — | — |
| | | B-8 | — | — | — | — | — | — | — |
| | | B'-1 | — | — | — | — | — | — | — |
| | | B'-2 | — | — | — | — | — | — | — |
| | | B'-3 | — | — | — | — | — | — | — |
| | Component C | C-1 | 2 | 2 | 2 | 2 | 2 | 2 | 2 |
| | | C-2 | 0.4 | 0.4 | 0.4 | 0.4 | 0.4 | 0.4 | 0.4 |
| | Component D | D-1 | 50 | — | 50 | — | 50 | 50 | 50 |
| | | D-2 | — | 50 | — | 50 | — | — | — |
| Characteristics of coating film | Adhesion | | 100/100 | 100/100 | 100/100 | 100/100 | 100/100 | 100/100 | 100/100 |
| | Pencil hardness | | 2H | H | 2H | H | 2H | 2H | 2H |
| | Boiling water resistance | | Good | Good | Good | Good | Good | Good | Good |
| | Solvent resistance | | Good | Good | Good | Good | Good | Good | Good |
| | Weatherability | | Good | Good | Good | Good | Good | Good | Good |

Note:
C-1: N-β-aminoethyl-γ-aminopropyl methyldimethoxysilane
C-2: Dibuthyltin dilaurate

TABLE 2

| | | | Ex. 8 | Ex. 9 | Ex. 10 | Ex. 11 | Ex. 12 | Ex. 13 | Ex. 14 |
|---|---|---|---|---|---|---|---|---|---|
| Formulation of coating resin composition (parts) | Component A | A-1 | 50 | 50 | 50 | 50 | 30 | — | 30 |
| | | A-2 | — | — | — | — | — | 30 | — |
| | Component B | B-1 | — | — | — | — | 70 | 70 | — |
| | | B-2 | — | — | — | — | — | — | 70 |
| | | B-3 | — | — | — | — | — | — | — |
| | | B-4 | — | — | — | — | — | — | — |
| | | B-5 | 20 | — | — | — | — | — | — |
| | | B-6 | — | 20 | — | — | — | — | — |
| | | B-7 | — | — | 20 | — | — | — | — |
| | | B-8 | — | — | — | 20 | — | — | — |
| | | B'-1 | — | — | — | — | — | — | — |
| | | B'-2 | — | — | — | — | — | — | — |
| | | B'-3 | — | — | — | — | — | — | — |

TABLE 2-continued

|  |  |  | Ex. 8 | Ex. 9 | Ex. 10 | Ex. 11 | Ex. 12 | Ex. 13 | Ex. 14 |
|---|---|---|---|---|---|---|---|---|---|
|  | Component C | C-1 | 2 | 2 | 2 | 2 | 2 | 2 | 2 |
|  |  | C-2 | 0.4 | 0.4 | 0.4 | 0.4 | 0.4 | 0.4 | 0.4 |
|  | Component D | D-1 | 50 | 50 | 50 | 50 | — | — | — |
|  |  | D-2 | — | — | — | — | — | — | — |
| Characteristics of coating film | Adhesion |  | 100/100 | 100/100 | 92/100 | 96/100 | 100/100 | 100/100 | 100/100 |
|  | Pencil hardness |  | 2H | 2H | 3H | 3H | 2H | 2H | 2H |
|  | Boiling water resistance |  | Good | Good | Good | Good | Good | Good | Good |
|  | Solvent resistance |  | Good | Good | Good | Good | Good | Good | Good |
|  | Weatherability |  | Good | Good | Good | Good | Good | Good | Good |

Note:
C-1: N-β-aminoethyl-γ-aminopropyl methyldimethoxysilane
C-2: Dibuthyltin dilaurate

TABLE 3

|  |  |  | Ex. 15 | Ex. 16 | Ex. 17 | Ex. 18 | Ex. 19 | Ex. 20 | Comp. Ex. 1 |
|---|---|---|---|---|---|---|---|---|---|
| Formulation of coating resin composition (parts) | Component A | A-1 | 30 | 30 | 30 | 30 | 30 | 30 | 50 |
|  |  | A-2 | — | — | — | — | — | — | — |
|  | Component B | B-1 | — | — | — | — | — | — | — |
|  |  | B-2 | — | — | — | — | — | — | — |
|  |  | B-3 | 70 | — | — | — | — | — | — |
|  |  | B-4 | — | 70 | — | — | — | — | — |
|  |  | B-5 | — | — | 70 | — | — | — | — |
|  |  | B-6 | — | — | — | 70 | — | — | — |
|  |  | B-7 | — | — | — | — | 70 | — | — |
|  |  | B-8 | — | — | — | — | — | 70 | — |
|  |  | B'-1 | — | — | — | — | — | — | 20 |
|  |  | B'-2 | — | — | — | — | — | — | — |
|  |  | B'-3 | — | — | — | — | — | — | — |
|  | Component C | C-1 | 2 | 2 | 2 | 2 | 2 | 2 | 2 |
|  |  | C-2 | 0.4 | 0.4 | 0.4 | 0.4 | 0.4 | 0.4 | 0.4 |
|  | Component D | D-1 | — | — | — | — | — | — | 50 |
|  |  | D-2 | — | — | — | — | — | — | — |
| Characteristics of coating film | Adhesion |  | 100/100 | 100/100 | 100/100 | 100/100 | 99/100 | 98/100 | 32/100 |
|  | Pencil hardness |  | 2H | 2H | 3H | 3H | 3H | 4H | 2H |
|  | Boiling water resistance |  | Good | Good | Good | Good | Good | Good | Good |
|  | Solvent resistance |  | Good | Good | Good | Good | Good | Good | Swells |
|  | Weatherability |  | Good | Good | Good | Good | Good | Good | Cracks |

Note:
C-1: N-β-aminoethyl-γ-aminopropyl methyldimethoxysilane
C-2: Dibuthyltin dilaurate

TABLE 4

|  |  |  | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Formulation of coating resin composition (parts) | Component A | A-1 | 50 | 50 | 30 | 30 | 30 | 50 | 30 |
|  |  | A-2 | — | — | — | — | — | — | — |
|  | Component B | B-1 | — | — | — | — | — | 20 | 70 |
|  |  | B-2 | — | — | — | — | — | — | — |
|  |  | B-3 | — | — | — | — | — | — | — |
|  |  | B-4 | — | — | — | — | — | — | — |
|  |  | B-5 | — | — | — | — | — | — | — |
|  |  | B-6 | — | — | — | — | — | — | — |
|  |  | B-7 | — | — | — | — | — | — | — |
|  |  | B-8 | — | — | — | — | — | — | — |
|  |  | B'-1 | — | — | 70 | — | — | — | — |
|  |  | B'-2 | 20 | — | — | 70 | — | — | — |
|  |  | B'-3 | — | 20 | — | — | 70 | — | — |
|  | Component C | C-1 | 2 | 2 | 2 | 2 | 2 | — | — |
|  |  | C-2 | 0.4 | 0.4 | 0.4 | 0.4 | 0.4 | — | — |
|  | Component D | D-1 | 50 | 50 | — | — | — | 50 | — |
|  |  | D-2 | — | — | — | — | — | — | — |
| Characteristics of coating film | Adhesion |  | 32/100 | 100/100 | 3/100 | 28/100 | 100/100 | 8/100 | 17/100 |
|  | Pencil hardness |  | 2H | 2B or under | 2H | 2H | 2B or under | 2B or under | 2B or under |
|  | Boiling water resistance |  | Peeling | Peeling | Good | Peeling | Peeling | Peeling | Peeling |

TABLE 4-continued

|  | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|
| Solvent resistance | Good | Swells | Swells | Good | Swells | Swells | Swells |
| Weatherability | Good | Cracks | Cracks | Good | Cracks | Cracks | Cracks |

Note:
C-1: N-β-aminoethyl-γ-aminopropyl methyldimethoxysilane
C-2: Dibuthyltin dilaurate

TABLE 5

|  |  | Ex. 21 | Ex. 22 | Ex. 23 | Ex. 24 | Ex. 25 |
|---|---|---|---|---|---|---|
| Formulation of coating resin composition (parts) | | | | | | |
| Component A | A-1 | 50 | 50 | 50 | 50 | 30 |
| Component B | B-1 | — | — | — | — | — |
|  | B-9 | 20 | — | — | — | 70 |
|  | B-10 | — | 20 | — | — | — |
|  | B-11 | — | — | 20 | — | — |
|  | B-12 | — | — | — | 20 | — |
|  | B'-4 | — | — | — | — | — |
|  | B'-5 | — | — | — | — | — |
|  | B'-6 | — | — | — | — | — |
| Component C | C-1 | 2 | 2 | 2 | 2 | 2 |
|  | C-2 | 0.4 | 0.4 | 0.4 | 0.4 | 0.4 |
| Component D | D-1 | 50 | 50 | 50 | 50 | — |

TABLE 5-continued

|  | Ex. 21 | Ex. 22 | Ex. 23 | Ex. 24 | Ex. 25 |
|---|---|---|---|---|---|
| Characteristics of coating film | | | | | |
| Adhesion | 100/100 | 100/100 | 100/100 | 100/100 | 100/100 |
| Pencil hardness | 2H | 2H | 3H | 3H | 2H |
| Boiling water resistance | Good | Good | Good | Good | Good |
| Solvent resistance | Good | Good | Good | Good | Good |
| Weatherability | Good | Good | Good | Good | Good |

Note:
C-1: N-β-aminoethyl-γ-aminopropyl methyldimethoxysilane
C-2: Dibuthyltin dilaurate

TABLE 6

|  |  |  | Ex. 26 | Ex. 27 | Ex. 28 | Comp. Ex. 9 | Comp. Ex. 10 | Comp. Ex. 11 | Comp. Ex. 12 |
|---|---|---|---|---|---|---|---|---|---|
| Formulation of coating resin composition (parts) | Component A | A-1 | 30 | 50 | 50 | — | — | — | — |
|  | Component B | B-1 | — | — | — | 100 | — | — | — |
|  |  | B-9 | — | — | — | — | 100 | — | — |
|  |  | B-10 | 70 | — | — | — | — | 100 | — |
|  |  | B-11 | — | 70 | — | — | — | — | 100 |
|  |  | B-12 | — | — | 70 | — | — | — | — |
|  |  | B'-4 | — | — | — | — | — | — | — |
|  |  | B'-5 | — | — | — | — | — | — | — |
|  |  | B'-6 | — | — | — | — | — | — | — |
|  | Component C | C-1 | 2 | 2 | 2 | 2 | 2 | 2 | 2 |
|  |  | C-2 | 0.4 | 0.4 | 0.4 | 0.4 | 0.4 | 0.4 | 0.4 |
|  | Component D | D-1 | — | — | — | — | — | — | — |
| Characteristics of coating film | Adhesion | | 100/100 | 100/100 | 100/100 | 100/100 | 100/100 | 100/100 | 100/100 |
|  | Pencil hardness | | 2H | 2H | 3H | HB | H | H | H |
|  | Boiling water resistance | | Good | Good | Good | Good | Good | Good | Good |
|  | Solvent resistance | | Good | Good | Good | Swells | Swells | Swells | Good |
|  | Weatherability | | Good | Good | Good | Cracks | Cracks | Cracks | Cracks |

Note:
C-1: N-β-aminoethyl-γ-aminopropyl methyldimethoxysilane
C-2: Dibuthyltin dilaurate

TABLE 7

|  |  | Comp. Ex. 13 | Comp. Ex. 14 | Comp. Ex. 15 | Comp. Ex. 16 |
|---|---|---|---|---|---|
| \multicolumn{6}{|l|}{Formulation of coating resin composition (parts)} |
| Component A | A-1 | — | 50 | 50 | 50 |
| Component B | B-1 | — | — | — | — |
|  | B-9 | — | — | — | — |
|  | B-10 | — | — | — | — |
|  | B-11 | — | — | — | — |
|  | B-12 | 100 | — | — | — |
|  | B'-4 | — | 20 | — | — |
|  | B'-5 | — | — | 20 | — |
|  | B'-6 | — | — | — | 20 |
| Component C | C-1 | 2 | 2 | 2 | 2 |
|  | C-2 | 0.4 | 0.4 | 0.4 | 0.4 |
| Component D | D-1 | 50 | 50 | 50 | 50 |

TABLE 7-continued

|  | Comp. Ex. 13 | Comp. Ex. 14 | Comp. Ex. 15 | Comp. Ex. 16 |
|---|---|---|---|---|
| Characteristics of coating film | | | | |
| Adhesion | 100/100 | 34/100 | 100/100 | 100/100 |
| Pencil hardness | H | 2H | HB | H |
| Boiling water resistance | Good | Good | Peeling | Peeling |
| Solvent resistance | Good | Good | Swells | Good |
| Weatherability | Cracks | Good | Cracks | Good |

Note:
C-1: N-β-aminoethyl-γ-aminopropyl methyldimethoxysilane
C-2: Dibuthyltin dilaurate

TABLE 8

|  |  |  | Ex. 29 | Ex. 30 | Ex. 31 | Ex. 32 | Ex. 33 | Ex. 34 | Ex. 35 |
|---|---|---|---|---|---|---|---|---|---|
| Formulation of coating resin composition (parts) | Component A | A-1 | 50 | 50 | 50 | 50 | 50 | 30 | 30 |
|  | Component B | B-1 | 20 | — | — | — | — | 70 | — |
|  |  | B-2 | — | 20 | — | — | — | — | 70 |
|  |  | B-3 | — | — | 20 | — | — | — | — |
|  |  | B-4 | — | — | — | 20 | — | — | — |
|  |  | B-5 | — | — | — | — | 20 | — | — |
|  | Component C | C-1 | 2 | 2 | 2 | 2 | 2 | 2 | 2 |
|  |  | C-2 | 0.4 | 0.4 | 0.4 | 0.4 | 0.4 | 0.4 | 0.4 |
|  | Component D | D-1 | 50 | 50 | 50 | 50 | 50 | — | — |
| Characteristics of coating film | Adhesion | | 100/100 | 100/100 | 100/100 | 100/100 | 100/100 | 100/100 | 100/100 |
|  | Pencil hardness | | 2H | 2H | 2H | 2H | 3H | H | H |
|  | Boiling water resistance | | Good | Good | Good | Good | Good | Good | Good |
|  | Solvent resistance | | Good | Good | Good | Good | Good | Good | Good |
|  | Weatherability | | Good | Good | Good | Good | Good | Good | Good |
|  | Gloss | | 80% | 82% | 80% | 85% | 82% | 78% | 75% |

Note:
C-1: N-β-aminoethyl-γ-aminopropyl methyldimethoxysilane
C-2: Dibuthyltin dilaurate

TABLE 9

|  |  |  | Ex. 36 | Ex. 37 | Ex. 38 | Comp. Ex. 17 | Comp. Ex. 18 | Comp. Ex. 19 | Comp. Ex. 20 |
|---|---|---|---|---|---|---|---|---|---|
| Formulation of coating resin composition (parts) | Component A | A-1 | 30 | 30 | 30 | 100 | — | — | — |
|  | Component B | B-1 | — | — | — | — | — | 100 | 50 |
|  |  | B-2 | — | — | — | — | — | — | — |
|  |  | B-3 | 70 | — | — | — | — | — | — |
|  |  | B-4 | — | 70 | — | — | — | — | — |
|  |  | B-5 | — | — | 70 | — | — | — | — |
|  | Component C | C-1 | 2 | 2 | 2 | 2 | 2 | 2 | 2 |
|  |  | C-2 | 0.4 | 0.4 | 0.4 | 0.4 | 0.4 | 0.4 | 0.4 |
|  | Component D | D-1 | — | — | — | — | 100 | — | 50 |
| Characteristics of coating film | Adhesion | | 100/100 | 100/100 | 100/100 | No film formed | 100/100 | 100/100 | 100/100 |
|  | Pencil hardness | | 2H | 2H | 2H | No film formed | 2B or under | 2B or under | 2B or under |
|  | Boiling water resistance | | Good | Good | Good | No film formed | Good | Good | Good |
|  | Solvent resistance | | Good | Good | Good | No film formed | Swells | Swells | Good |
|  | Weatherability | | Good | Good | Good | No film formed | Good | Discolor- | Good |

TABLE 9-continued

|  | Ex. 36 | Ex. 37 | Ex. 38 | Comp. Ex. 17 | Comp. Ex. 18 | Comp. Ex. 19 | Comp. Ex. 20 |
|---|---|---|---|---|---|---|---|
| Gloss | 78% | 82% | 80% | formed No film formed | 65% | ation 70% | 60% |

Note:
C-1: N-β-aminoethyl-γ-aminopropyl methyldimethoxysilane
C-2: Dibuthyltin dilaurate

Examples 39 to 54

By coating the coating resin composition of Example 1 on various substrates, resin-coated articles were produced. And then a characteristic of coating film were evaluated by the same method as Example 1. As the substrates, were used what follows.

Glass plate: Soda glass plate (size 76 mm×52 mm×0.7 mm).

Aluminium plate: Surface-anodized aluminium plate (size 150 mm×70 mm×0.3 mm).

Stainless plate: SUS303 plate (size 150 mm×70 mm×0.5 mm).

PC plate: Polycarbonate plate (size 10 mm×10 mm×2.5 mm).

PMMA plate: Polymethylmethacrylate plate(size 10 mm×10 mm×2.5 mm).

Inorganic plate: [Multi Siding] made by Matsushita Electric Works, Ltd. in Japan, (Acrylemulsion sealer-coating cement plate having bulk density of 1.0 g/cm$^3$ and dimensional change of 0.3% under a condition changing from the saturated-water-containing to the absolute drying), (size 150 mm×70 mm×5 mm).

Processed inorganic plate: This is what processed the inorganic that mentioned above at sizes and shapes shown in FIGS. 1 and 2.

Alumina plate: Alumina-sintered plate using for electric circuit-board, made by Matsushita Electric Works, Ltd in Japan.

Incidentally, as a primer, [Epo E Sealer] of epoxy sealer (made by Isamu Toryo Co. Ltd. in Japan) was used when necessary. Although it have brought no problem even if the primer was not used, however, in the case that sufficient adhesion would be required after treating in boiling water for 5 hours, preferably the primer is used.

The results were shown in Tables 10 to 12.

As seen in Tables 10 to 12, sufficient performance of coating film were obtained in the case of every substrate. Particularly, even if a substrate having uneven surface such as the processed inorganic plate are used, coated articles in which cracks do not develop are obtained, which is one of the characteristics of the invention.

Examples 55 to 62

The resin-coated article of the invention is capable of processing after coating if the substrate is capable of processing. On the Stainless plate (SUS303)(size 150 mm×70 mm×0.5 mm), the primer (Epo E Sealer (made by Isamu Toryo Co. Ltd. in Japan)) was treated, further the resin coating composition of Example 1 was coated. And then the following processings were conducted.

Bending processing: Bending at 90° with R5.

Punching processing: Punching a hole of a diameter of 50 mm by using a punching press.

Boring processing: Boring a hole of a diameter of 50 mm by using a drill.

Cutting processing: Cutting with a press cutter.

Also, for What were processed the same as above, a primer treating and a resin coating were further conducted by the same as what mentioned above, by which the coated articles were produced at the same time. And then a performance of coating film were evaluated.

The results were shown in Tables 13 to 14.

As seen in Tables 13 to 14, sufficient performance of coating film were obtained in the every case.

Examples 63 to 70

The primer is not limited to the epoxy primer that mentioned above. With using the following coatings and primers which have already marketed, the coated articles were evaluated by the same method as what mentioned above. A coating way obeyed specifications of each primer and coating, and then they were coated so that film thickness would become about 1 μm.

Epoxy type: Epo E Sealer (made by Isamu Toryo Co. Ltd. in Japan)

Acryl type: Perma Rock (made by Rock Paint Co. Ltd. in Japan)

Acrylsilicone type: Neo Silica #5000 (made by Isamu Toryo Co. Ltd. in Japan)

Chlorinated rubber type: Rubberl #100 Primer (made by Shinto Toryo Co. Ltd. in Japan)

Urethane type: Epicon Primer CL (made by Chugoku Toryo Co. Ltd. in Japan)

Phenol type: New Akunon Primer (made by Kansai Paint Co. Ltd. in Japan)

Polyester type: Poly Best Pate #100 (made by Dainihon Toryo Co. Ltd. in Japan)

Melamine type: Amilac (made by Kansai Paint Co. Ltd. in Japan)

The results were shown in Tables 15 to 16.

As seen in Tables 15 to 16, although there are suitable or not with the use or the required characteristics, as far as a characteristic of coating film, all cases shown good results.

Examples 71 to 75 and Comparative Examples 21 to 23

Next, in order to produce the resin-coated articles, preparation examples of the primer composition containing the components (a-1) to (d-1), which is particularly suitable, are described.

(preparation of solution S-1):

The following components were mixed, and then were added dropwise into a mixed solution of 350 parts by weight of water and 50 parts by weight of methanol entered a vessel equipped with reflux condenser with stirring while maintaining the temperature at 50° C., by which were hydrolyzed and condensed.

Dimethylchlorosilane: 7 parts by weight
Methyltrichlorosilane: 40 parts by weight
Diphenylchlorosilane: 48 parts by weight
Phenyltyichlorosilane: 78 parts by weight
Toluene: 95 parts by weight Formed polymethylsiloxane had the by-produced hydrogen chloride removed by washing with water. By heating this under vacuum, the remaining water as a part of solvent was removed, by which toluene solution of silicone resin being concentration 50% was obtained. Next, the solution of containing the following components were prepared, and it was gradually heated up with removing toluene under stirring, and besides at a point reached 230° C., further continued heating for 5 hours while maintaining that temperature.

Bisphenol A epichlorohydrin epoxy resin (epoxy equivalent: 500): 7 parts by weight
Phthalic anhydride: 5 parts by weight
Linseed oil fatty acid: 10 parts by weight
Toluene 75 parts by weight To this, 50 parts by weight of the previous toluene solution of silicone and toluene of which the amount would make the solid content of the whole 50% were added, and then that was stirring until the solution turned to clear, whereby S-1 being a toluene solution of epoxy-modified silicone resin was obtained.

(preparation of solution S-2):

The following components were mixed, and then were added dropwise into 320 parts by weight of water with stirring while maintaining the temperature at 50° C., and after then in the same way as the S-1, xylene solution of silicone resin being concentration 60% was obtained.

Dimethylchlorosilane: 51 parts by weight
Methyltrichlorosilane: 15 parts by weight
Diphenylchlorosilane: 44 parts by weight
Phenyltyichlorosilane: 52 parts by weight
xylene: 50 parts by weight Next, the solution containing the following components were prepared, and then, 51 parts by weight of the previous toluene solution of silicone was added to this, and heating and stirring were conducted for 3 hours at reflux temperature.

Bisphenol A epichlorohydrin epoxy resin (epoxy equivalent: 500): 54 parts by weight
Dodecyl succinic acid: 25 parts by weight
Xylene 23 parts by weight Further, a required amount of xylene was added, whereby S-2 a 50% xylene solution of epoxy-modified silicone resin was obtained.

(preparation of solution S-2):

The following components were mixed, and then were added dropwise into a mixed solution of 40 parts by weight of methanol and 15 parts by weight of water with stirring while maintaining the temperature 50° C. and less. Next, that was heated up until 70° C. with stirring, and was heated with refluxing for 1 hour, and after then, was allowed to cool and 40 parts by weight of methanol was added, whereby was separated. Collected layer of polyorganosiloxane was added 2 parts by weight of calcium carbonate by which by-produced hydrogen chloride was neutralized, and after that, by heating under vacuum was removed methanol and low-boiling compounds, whereby fluid polyorganosiloxane was obtained. This polyorganosiloxane 50 parts by weight was added the following, and then had been heated for 3 hours under xylene refluxing. After cooling and filtering, S-1 being a 50% xylene solution of epoxy-modified silicone resin was obtained.

Novolak epoxy resin (epoxy equivalent: 180): 45 parts by weight
Phthalic anhydride: 3.5 parts by weight
Xylene: 100 parts by weight After cooling and filtering, S-1 being a 50% xylene solution of epoxy-modified silicone resin was obtained.

Also, the isocyanate compositions were used is the following.

(Solution I-1): 75% butyl acetate solution of isocyanate prepolymer mixture shown in the formula (VI).
(Solution I-2): 75% butyl acetate solution of isocyanate prepolymer mixture shown in the formula (IV).
(Solution I-3): 50% ethyl acetate solution of isocyanate prepolymer mixture shown in the formula (IX).

The primer compositions were prepared with a ratio shown in Tables 17 to 18. By using the primer compositions obtained above and the coating resin composition of Example 1, the resin-coated articles were produced in the same method as mentioned above, and were evaluated in the same method as mentioned above. The primer composition was coated with spray coating and then had been hot-cured at 80° C., for 20 minutes.

The results were shown in Tables 17 to 18.

As seen in Tables 17 to 18, with reference to Examples, performances of coating film was good, and After a 5000 hour accelerated weathering test by a sunshine weatheromater, coating film was not released and also the discoloring of that was a level not to admit with visual observation.

Examples 76 to 81 and Comparative Examples 24 to 26

Next, in order to produce the resin-coated articles, preparation examples of the primer composition containing the components (a-2) to (d-2), which is particularly suitable, are described.

First, with reference to preparation of the hydrolyzable-group-containing vinyl copolymer, in a reaction vessel equipped with a stirrer, a cooler and a thermometer, a monomer shown in Table 19 were placed. And to this, toluene being double amount of the monomer as well as chain transfer agent and polymerization initiator were added, and then, the reaction was allowed to conduct with uniformly stirring under atmosphere of nitrogen gas, at 70° C., for 2 hours. Each of the hydrolyzable-group-containing vinyl copolymers were obtained were referred to P-1 to P-6. Molecular weight was measured by the method as mentioned above. The epoxy-modified silicone resins were used the solution S-1 to S-3 that mentioned above. By using the primer compositions obtained above and the coating resin composition of Example 1, the resin-coated articles were produced in the same method as mentioned above, and were evaluated in the same method as mentioned above.

The results were shown in Tables 20 to 21.

Examples 82 to 85

Next, Examples of using a coloring primer are described. The primer composition which had been used in Example 71 was used, whereto four pigments shown in the following were added, and then was treated with a sand mill for 60 minutes, and that was used as the primer composition just as it was.

White: White Pigment (made by Ishihara Sangyo, Co. Ltd. in Japan). 45% adding on the basis of a solid fraction of the primer.

Yellow: Yellow Pigment (made by Dainitiseika Kogyo, Co. Ltd. in Japan). 60% adding on the basis of a solid fraction of the primer.

Brown: Brown Pigment (made by Dainitiseika Kogyo, Co. Ltd. in Japan). 30% adding on the basis of a solid fraction of the primer.

Black: Black Pigment (made by Dainitiseika Kogyo, Co. Ltd. in Japan). 25% adding on the basis of a solid fraction of the primer.

The primer composition was applied by spray coating and then was cured by heating at 80° C. for 20 minutes. On that, the coating resin composition of Example 1 was applied so that the thickness would be 30 μm, and then was cured by heating at 80° C. for 20 minutes. The results were shown in Table 22.

Example 86

Next, example which was given a high quality appearance to a inorganic curing bodies was shown in table 23. Two pigments of the following was added into the coating resin composition of Example 1, whereby two enamels were prepared.

Pigment 1: White Pigment (made by Ishihara Sangyo, Co. Ltd. in Japan) 61%
Yellow Pigment (made by Dainitiseika Kogyo, Co. Ltd. in Japan) 22%
Black Pigment (made by Dainitiseika Kogyo, Co. Ltd. in Japan) 17%

Pigment 2: White Pigment (made by Ishihara Sangyo, Co. Ltd. in Japan) 77%
Yellow Pigment (made by Dainitiseika Kogyo, Co. Ltd. in Japan) 13%
Black Pigment (made by Dainitiseika Kogyo, Co. Ltd. in Japan) 5%

Brown Pigment (made by Dainitiseika Kogyo, Co. Ltd. in Japan) 5%

Figure 2:
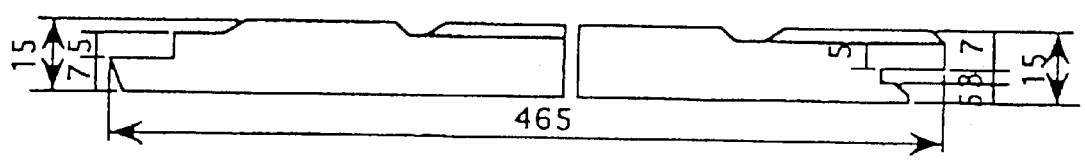
FIG. 2 is section view illustrating uneven portion of processing inorganic curing bodies shown in FIG. 1.

On the inorganic curing body shown in FIGS. 1 and 2, the primer composition (using in Example 76; 1 μm of thickness), the coating resin composition (using in Example 1; Pigment 1; 10 μm of thickness) and the resin composition (using in Example 1; Pigment 2; 10 μm of thickness) were coated by spray coating and cured by heating in order. The curing by heating were conducted under a condition of heating at 80° C. for 20 minutes in each case. As a result, there was no problem in the properties of coating film as shown in table 23. Also, the thickness of film differed between convex portion and concave one on account of the flow of coating, so that the appearance of which the color and gloss differed between convex portion and concave one was obtained.

Examples 87 to 90

Next, examples which a marketed coloring coating or the coloring coating according to the invention were coated on a substrate that was treated with a primer, further a clear coating according to the invention was coated, were shown in table 24. Owing to this, the coated articles that the coated surface of a marketed coating was protective coated, could be obtained. A marketed intercoat coating were spray-coated with obeying a maker specifications. As shown in Table 24, there were no problems in every case, the coated articles having excellent serviceability were obtained.

Examples 91 to 94

Next, examples which a substrate coloring coating or the coloring coating according to the invention were coated on a substrate that was not treated with a primer, further a clear coating according to the invention was coated, were shown in table 25. As shown in Table 25, in every case of these, a sufficient properties of coating film that serviceability was excellent, were obtained.

TABLE 10

|  |  | Ex. 39 | Ex. 40 | Ex. 41 | Ex. 42 | Ex. 43 | Ex. 44 | Ex. 45 |
|---|---|---|---|---|---|---|---|---|
| Coating |  | Ex. 1 | Ex. 1 | Ex. 1 | Ex. 1 | Ex. 1 | Ex. 1 | Ex. 1 |
| Primer |  | None | None | None | None | None | None | None |
| Substrate |  | Glass plate | Aluminum plate | Stainless plate | PC plate | PMMA plate | Inorganic plate | Inorganic process plate |
| Characteristics of coating film | Adhesion | 100/100 | 100/100 | 100/100 | 100/100 | 100/100 | 100/100 | 100/100 |
|  | Pencil hardness | 2H | 2H | 2H | H | H | H | H |
|  | Boiling water resistance | Good | Good | Partially peeling | Partially peeling | Partially peeling | Good | Good |
|  | Solvent resistance | Good | Good | Good | Good | Good | Good | Good |
|  | Weatherability | Good | Good | Good | Good | Good | Good | Good |
|  | Gloss | 78% | 82% | 80% | 76% | 72% | 70% | 70% |

TABLE 11

|  |  | Ex. 46 | Ex. 47 | Ex. 48 | Ex. 49 | Ex. 50 | Ex. 51 | Ex. 52 |
|---|---|---|---|---|---|---|---|---|
| Coating |  | Ex. 1 | Ex. 1 | Ex. 1 | Ex. 1 | Ex. 1 | Ex. 1 | Ex. 1 |
| Primer |  | None | Having* | Having* | Having* | Having* | Having* | Having* |
| Substrate |  | Aluminum plate | Glass plate | Aluminum plate | Stainless plate | PC plate | PMMA plate | Inorganic plate |
| Characteristics of coating film | Adhesion | 100/100 | 100/100 | 100/100 | 100/100 | 100/100 | 100/100 | 100/100 |
|  | Pencil | 2H | 2H | 2H | 2H | H | H | H |

TABLE 11-continued

|  | Ex. 46 | Ex. 47 | Ex. 48 | Ex. 49 | Ex. 50 | Ex. 51 | Ex. 52 |
|---|---|---|---|---|---|---|---|
| hardness |  |  |  |  |  |  |  |
| Boiling water resistance | Good | Good | Good | Good | Good | Good | Good |
| Solvent resistance | Good | Good | Good | Good | Good | Good | Good |
| Weather-ability | Good | Good | Good | Good | Good | Good | Color changed |
| Gloss | 60% | 78% | 82% | 80% | 76% | 72% | 70% |

Note:
*As a primer, Epo E sealer (Isamu Toryo Co., Ltd. in Japan) was used.

TABLE 12

|  |  | Ex. 53 | Ex. 54 |
|---|---|---|---|
| Coating |  | Ex. 1 | Ex. 1 |
| Primer |  | Having* | Having* |
| Substrate |  | Inorganic process plate | Alumina plate |
| Characteristics of coating film | Adhesion | 100/100 | 100/100 |
|  | Pencil hardness | 2 H | 2 H |
|  | Boiling water resistance | Good | Good |
|  | Solvent resistance | Good | Good |
|  | Weatherability | Good | Good |
|  | Gloss | 60% | 78% |

Note: *: As a primer, Epo E sealer (Isamu Toryo Co., Ltd. in Japan) was used.

TABLE 13

|  |  | Ex. 55 | Ex. 56 | Ex. 57 | Ex. 58 |
|---|---|---|---|---|---|
| Substrate |  | Stainless plate | Stainless plate | Stainless plate | Stainless plate |
| Coating of first layer |  | Ex. 1 | Ex. 1 | Ex. 1 | Ex. 1 |
| Primer of first layer |  | Having* | Having* | Having* | Having* |
| Processing |  | Bending | Punching | Boring | Cutting |
| Coating of second layer |  | None | None | None | None |
| Primer of second layer |  | None | None | None | None |
| Characteristics of coating film | Adhesion | 100/100 | 100/100 | 100/100 | 100/100 |
|  | Pencil hardness | 2H | 2H | 2H | 2H |
|  | Boiling water resistance | Good | Good | Good | Good |
|  | Solvent resistance | Good | Good | Good | Good |
|  | Weatherability | Good | Good | Good | Good |
|  | Gloss | 80% | 78% | 82% | 80% |

Note:
*As a primer, Epo E sealer (Isamu Toryo Co., Ltd. in Japan) was used.

TABLE 14

|  |  | Ex. 59 | Ex. 60 | Ex. 61 | Ex. 62 |
|---|---|---|---|---|---|
| Substrate |  | Stainless plate | Stainless plate | Stainless plate | Stainless plate |
| Coating of first layer |  | Ex. 1 | Ex. 1 | Ex. 1 | Ex. 1 |
| Primer of first layer |  | Having* | Having* | Having* | Having* |
| Processing |  | Bending | Punching | Boring | Cutting |
| Coating of second layer |  | Ex. 1 | Ex. 1 | Ex. 1 | Ex. 1 |
| Primer of second layer |  | Having* | Having* | Having* | Having* |
| Characteristics of coating film | Adhesion | 100/100 | 100/100 | 100/100 | 100/100 |
|  | Pencil hardness | 2H | 2H | 2H | 2H |
|  | Boiling water resistance | Good | Good | Good | Good |
|  | Solvent resistance | Good | Good | Good | Good |
|  | Weatherability | Good | Good | Good | Good |
|  | Gloss | 79% | 76% | 84% | 81% |

Note:
*As a primer, Epo E sealer (Isamu Toryo Co., Ltd. in Japan) was used.

TABLE 15

|  |  | Ex. 63 | Ex. 64 | Ex. 65 | Ex. 66 |
|---|---|---|---|---|---|
| Substrate |  | Stainless plate | Stainless plate | Stainless plate | Stainless plate |
| Coating |  | Ex. 1 | Ex. 1 | Ex. 1 | Ex. 1 |
| Primer |  | Having*1 | Having*2 | Having*3 | Having*4 |
| Characteristics of coating film | Adhesion | 100/100 | 100/100 | 100/100 | 100/100 |
|  | Pencil hardness | 2H | 2H | 2H | 2H |
|  | Boiling water resistance | Good | Good | Good | Good |
|  | Solvent resistance | Good | Good | Good | Good |
|  | Weatherability | Good | Good | Good | Good |
|  | Gloss | 81% | 83% | 82% | 80% |

Note:
*1: Epoxy type: Epo E Sealer (made by Isamu Toryo Co., Ltd, in Japan)
*2: Acryl type: Perma Rock (made by Rock Paint Co., Ltd. in Japan)
*3: Acrylsilicon type: Neo Silica #5000 (made by Isamu Toryo Co., Ltd. in Japan)
*4: Chlorinated rubber type: Rubber1 #100 Primer (made by Shinto Toryo Co., Ltd. in Japan)

TABLE 16

|  | Ex. 67 | Ex. 68 | Ex. 69 | Ex. 70 |
|---|---|---|---|---|
| Substrate | Stainless | Stainless | Stainless | Stainless |

TABLE 16-continued

|  |  | Ex. 67 | Ex. 68 | Ex. 69 | Ex. 70 |
|---|---|---|---|---|---|
| Coating Primer | | plate Ex. 1 Having*5 | plate Ex. 1 Having*6 | plate Ex. 1 Having*7 | plate Ex. 1 Having*8 |
| Characteristics of coating film | Adhesion | 100/100 | 100/100 | 100/100 | 100/100 |
| | Pencil hardness | 2H | 2H | 2H | 2H |
| | Boiling water resistance | Good | Good | Good | Good |
| | Solvent resistance | Good | Good | Good | Good |
| | Weatherability | Good | Good | Good | Good |
| | Gloss | 79% | 81% | 78% | 84% |

Note:
*5: Urethane type: Epicon Primer CL (made by Chugoku Toryo Co., Ltd. in Japan)
*6: Phenol type: New Akunon Primer (made by Kansai Paint Co., Ltd. in Japan)
*7: Polyester type: poly Best #100 (made by Dainihon Toryo Co., Ltd. in Japan)
*8: Melamine type: Amilac (made by Kansai Paint Co., Ltd. in Japan)

TABLE 17

|  | Ex. 71 | Ex. 72 | Ex. 73 | Ex. 74 |
|---|---|---|---|---|
| Substrate | Stainless plate | Stainless plate | Stainless plate | Stainless plate |
| Coating | Ex. 1 | Ex. 1 | Ex. 1 | Ex. 1 |
| Primer composition (parts) | | | | |
| I-1 | 100 | — | — | 50 |
| I-2 | — | 100 | — | 50 |
| I-3 | — | — | 100 | — |
| S-1 | 20 | 20 | 15 | — |
| S-2 | — | — | — | 20 |
| S-3 | — | — | — | — |
| Mercapto 1*1 | 12 | 12 | 10 | — |
| Mercapto 2*2 | — | — | — | 15 |
| Organotin 1*3 | 0.5 | 0.5 | 0.5 | — |
| Organotin 2*4 | — | — | — | 0.5 |
| Ethyl acetate | 30 | 30 | 30 | 30 |
| Characteristics of coating film | | | | |
| Adhesion | 100/100 | 100/100 | 100/100 | 100/100 |
| Pencil hardness | 2H | 2H | 2H | 2H |
| Boiling water resistance | Good | Good | Good | Good |
| Solvent resistance | Good | Good | Good | Good |

TABLE 17-continued

|  | Ex. 71 | Ex. 72 | Ex. 73 | Ex. 74 |
|---|---|---|---|---|
| Weatherability | Good | Good | Good | Good |
| Gloss | 76% | 80% | 81% | 81% |

Note:
*1: γ-Mercaptopropyltrimethoxysilane
*2: γ-Mercaptopropyltrimethoxysilane
*3: Dibutyltindilaurate
*4: Dibutyltinoxide

TABLE 18

|  | Ex. 75 | Com. Ex. 21 | Com. Ex. 22 | Com. Ex. 23 |
|---|---|---|---|---|
| Substrate | Stainless plate | Stainless plate | Stainless plate | Stainless plate |
| Coating | Ex. 1 | Ex. 1 | Ex. 1 | Ex. 1 |
| Primer composition (parts) | | | | |
| I-1 | 50 | 100 | — | — |
| I-2 | 50 | — | — | — |
| I-3 | — | — | — | — |
| S-1 | — | — | 100 | — |
| S-2 | — | — | — | — |
| S-3 | 20 | — | — | — |
| Mercapto 1*1 | — | 15 | 15 | — |
| Mercapto 2*2 | 15 | — | — | — |
| Organotin 1*3 | — | 0.5 | 0.5 | — |
| Organotin 2*4 | 0.5 | — | — | — |
| Ethyl acetate | 30 | 30 | 30 | — |
| Characteristics of coating film | | | | |
| Adhesion | 100/100 | 100/100 | 100/100 | 100/100 |
| Pencil hardness | 2H | 2H | 2H | 2H |
| Boiling water resistance | Good | Partially peeling | Partially peeling | Partially peeling |
| Solvent resistance | Good | Good | Good | Good |
| Weatherability | Good | Good | Good | Good |
| Gloss | 77% | 79% | 78% | 77% |

Note:
*1: γ-Mercaptopropyltrimethoxysilane
*2: γ-Mercaptopropyltrimethoxysilane
*3: Dibutyltindilaurate
*4: Dibutyltinoxide

TABLE 19

|  |  | P-1 | P-2 | P-3 | P-4 | P-5 | P-6 |
|---|---|---|---|---|---|---|---|
| Number of moles | Monomer 1 | 0.85 | 0.95 | — | — | — | — |
| | Monomer 2 | — | — | 0.80 | 0.85 | 0.90 | 0.95 |
| | Monomer 3 | — | — | 0.20 | — | — | — |

TABLE 19-continued

|  | P-1 | P-2 | P-3 | P-4 | P-5 | P-6 |
|---|---|---|---|---|---|---|
| Monomer 4 | 0.15 | — | — | 0.15 | — | — |
| Monomer 5 | — | 0.05 | — | — | 0.10 | — |
| Monomer 6 | — | — | — | — | — | 0.05 |
| Chain transfer agent 1 | 0.05 | 0.01 | 0.10 | 0.05 | 0.01 | — |
| Polymerization initiator 1 | 0.002 | 0.002 | 0.002 | 0.002 | 0.002 | 0.002 |
|  | 6000 | 32000 | 3000 | 6000 | 34000 | 800000 |

Note:
Monomer 1: Methylacrylate
Monomer 2: Methylmethacrylate
Monomer 3: Vinyltrimethoxysilane
Monomer 4: Vinyltris (methylethylketoxime) silane
Monomer 5: 3-Methacryloxypropyltrimethoxysilane
Monomer 6: 3-Methacryloxypropytris (methylethylketoxime) silane
Chain transfer agent 1: 3-Mertcaptpropyltrimethoxysilane
Polymerization initiator 1: Azobisisobutyronitrile

TABLE 20

|  |  | Ex. 76 | Ex. 77 | Ex. 78 | Ex. 79 | Ex. 80 | Ex. 81 |
|---|---|---|---|---|---|---|---|
| Substrate |  | Stainless plate Ex. 1 | Stainless plate Ex. 1 | Stainless plate Ex. 1 | Stainless plate Ex. 1 | Stainless plate Ex. 1 | Stainless plate Ex. 1 |
| Coating Primer composition (parts) | P-1 | 100 | — | — | — | — | — |
|  | P-2 | — | 100 | — | — | — | — |
|  | P-3 | — | — | 100 | — | — | — |
|  | P-4 | — | — | — | 100 | — | — |
|  | P-5 | — | — | — | — | 100 | — |
|  | P-6 | — | — | — | — | — | 100 |
|  | S-1 | — | — | — | — | — | 100 |
|  | S-2 | — | — | — | — | 1--- | 100 |
|  | S-3 | — | — | — | — | — | 100 |
|  | Organotin 1*1 | 1 | — | 1 | 1 | — | — |
|  | Organotin 2*2 | — | 1 | — | — | 1 | 1 |
|  | Ethyl acetate | 50 | 50 | 50 | 50 | 50 | 50 |
| Characteristics of coating film | Adhesion | 100/100 | 100/100 | 100/100 | 100/100 | 100/100 | 100/100 |
|  | Pencil hardness | 2H | 2H | 2H | 2H | 2H | 2H |
|  | Boiling water resistance | Good | Good | Good | Good | Good | Good |
|  | Solvent resistance | Good | Good | Good | Good | Good | Good |
|  | Weatherability | Good | Good | Good | Good | Good | Good |
|  | Gloss | 77% | 81% | 80% | 82% | 79% | 79% |

Note:
*1: Dibutyltindilaurate
*2: Dibutyltinoxide

TABLE 21

|  |  | Com. Ex. 24 | Com. Ex. 25 | Com. Ex. 26 |
|---|---|---|---|---|
| Substrate |  | Stainless plate Ex. 1 | Stainless plate Ex. 1 | Stainless plate Ex. 1 |
| Coating Primer composition (parts) | P-1 | — | — | — |
|  | P-2 | 100 | — | — |
|  | P-3 | — | — | — |
|  | P-4 | — | — | — |
|  | P-5 | — | — | — |
|  | P-6 | — | — | — |
|  | S-1 | — | 100 | — |
|  | S-2 | — | — | — |
|  | S-3 | — | — | — |
|  | Organotin 1*1 | 1 | 1 | — |
|  | Organotin 2*2 | — | — | — |
|  | Ethyl acetate | 50 | 50 | — |
| Characteristics | Adhesion | 100/100 | 100/100 | 100/100 |
| of coating film | Pencil hardness | 2H | 2H | 2H |
|  | Boiling water resistance | Partially peeling | Partially peeling | Partially peeling |
|  | Solvent resistance | Good | Good | Good |
|  | Weatherability | Good | Good | Good |
|  | Gloss | 80% | 81% | 80% |

Note:
*1: Dibutyltindilaurate
*2 Dibutyltinoxide

TABLE 22

|  |  | Ex. 82 | Ex. 83 | Ex. 84 | Ex. 85 |
|---|---|---|---|---|---|
| Substrate | | Stainless plate | Stainless plate | Stainless plate | Stainless plate |
| Coating | | Ex. 1 | Ex. 1 | Ex. 1 | Ex. 1 |
| Primer composition | | White | Yellow | Brown | Black |
| Characteristics of coating film | Adhesion | 100/100 | 100/100 | 100/100 | 100/100 |
| | Pencil hardness | 2H | 2H | 2H | 2H |
| | Boiling water resistance | Good | Good | Good | Good |
| | Solvent resistance | Good | Good | Good | Good |
| | Weatherability | Good | Good | Good | Good |
| | Gloss | 84% | 81% | 78% | 72% |

TABLE 23

|  |  | Ex. 86 |
|---|---|---|
| Substrate | | |
| Primer | | Ex. 76 |
| Intercoat | | Ex. 1 |
| | | Pigment 1 |
| Topcoat | | Ex. 1 |
| | | Pigment 2 |
| Characteristics of coating film | Adhesion | 100/100 |
| | Pencil hardness | 2 H |
| | Boiling water resistance | Good |
| | Solvent resistance | Good |
| | Weatherability | Good |
| | Gloss | 80% |

TABLE 24

|  |  | Ex. 87 | Ex. 88 | Ex. 89 | Ex. 90 |
|---|---|---|---|---|---|
| Substrate | | Stainless plate | Stainless plate | Stainless plate | Stainless plate |
| Primer | | Ex. 76 | Ex. 76 | Ex. 76 | Ex. 76 |
| Intercoat | | Ex. 29 | Intercoat 1 | Intercoat 2 | Intercoat 3 |
| Topcoat | | Ex. 1 | Ex. 1 | Ex. 1 | Ex. 1 |
| Characteristics of coating film | Adhesion | 100/100 | 100/100 | 100/100 | 100/100 |
| | Pencil hardness | 2H | H | H | H |
| | Boiling water resistance | Good | Good | Good | Good |
| | Solvent resistance | Good | Good | Good | Good |
| | Weatherability | Good | Good | Good | Good |
| | Gloss | 82% | 82% | 79% | 76% |

Note:
Intercoat 1: Phthalic resin enamel (Unipack 200, made by Nippon Paint Co., Ltd. in Japan)
Intercoat 2: Polyurethane resin coating (Toa Urethane #100 Enamel, made by Toupe Co., Ltd. in Japan)
Intercoat 3: Acrylic coating (AP Enamel, made by Kansai Paint Co., Ltd. in Japan)

TABLE 25

|  |  | Ex. 91 | Ex. 92 | Ex. 93 | Ex. 94 |
|---|---|---|---|---|---|
| Substrate | | Aluminum plate | Aluminum plate | Aluminum plate | Aluminum plate |
| Primer | | None | None | None | None |
| Intercoat | | Ex. 29 | Intercoat 1 | Intercoat 2 | Intercoat 3 |
| Topcoat | | Ex. 1 | Ex. 1 | Ex. 1 | Ex. 1 |

TABLE 25-continued

|  |  | Ex. 91 | Ex. 92 | Ex. 93 | Ex. 94 |
|---|---|---|---|---|---|
| Characteristics of coating film | Adhesion | 100/100 | 100/100 | 100/100 | 100/100 |
| | Pencil hardness | 2H | H | H | H |
| | Boiling water resistance | Good | Good | Good | Good |
| | Solvent resistance | Good | Good | Good | Good |
| | Weatherability | Good | Good | Good | Good |
| | Gloss | 82% | 83% | 77% | 77% |

Note:
Intercoat 1: Phthalic resin enamel (Unipack 200, made by Nippon Paint Co., Ltd. in Japan)
Intercoat 2: Polyurethane resin coating (Toa Urethane #100 Enamel, made by Toupe Co., Ltd. in Japan)
Intercoat 3: Acrylic coating (AP Enamel, made by Kansai Paint Co., Ltd. in Japan)

The coating resin composition of the present invention consists essentially of the components (A), (B) and (C) or the components (A), (B), (C) and (D). Thus, the coating resin composition is able to form a coating film which has high toughness, high hardness, and high weatherability, and which is excellent in adhesion, solvent resistance, boiling water resistance, and fast drying property. The coating film is so good at toughness that it will not yield cracks at film thicknesses of up to 50 $\mu$m, thus being little non-uniformities in coating and showing a wide adaptability to irregularities of the substrate. The coating film is also adaptable to a wide range of dimensional changes due to the temperature or humidity of the substrate. The coating resin composition of the invention can be cured both by room temperature process and by heating process, thus being usable over a wide drying-and-curing condition range or temperature range. Accordingly, the coating resin composition can be applied for coating to substrates of poor heat resistance, and applied for coating even at working field where heating is unavailable, thus exhibiting high industrial value. Furthermore, the coating resin of the invention is high in storage stability, and can be preserved for long terms even with pigments dispersed and blended, allowing optional coloration.

With the method of producing for the resin coating composition according to the invention, coating resin compositions having excellent properties described above can be obtained easily.

The resin-coated article of the present invention comprises a cured resin layer of the coating resin composition mentioned above on the surface of a substrate. Thus, the resin-coated article comprises a coating film which has high toughness, high hardness, and high weatherability, and which is excellent in adhesion, solvent resistance, boiling water resistance, and fast drying property. This coating film is so good at toughness that it will not yield cracks at film thicknesses of up to 50 $\mu$m, thus being little non-uniformities in coating and showing a wide adaptability to irregularities of the substrate. The coating film is also adaptable to a wide range of dimensional changes due to the temperature or humidity of the substrate.

The resin-coated article of the present invention can be produced by using the coating resin composition which can be cured both by room temperature process and by heating process, thus being able to produce with over a wide drying-and-curing condition range or temperature range. Accordingly, the resin-coated article is usable with substrates of poor heat resistance, and produced even at working field where heating is unavailable, thus exhibiting high industrial value. Furthermore, the resin-coated article of the present invention can be produced by using the coating resin composition which is high in storage stability, and can be preserved for long terms even with pigments dispersed and blended, allowing optional coloration, thus being high at design and also having a wide usable range.

With the method of producing for the resin-coated article according to the invention, excellent resin-coated articles described above can be obtained easily.

What is claimed is:

1. A coating resin composition comprising:
  (A) a silica-dispersed oligomer solution of oranosilane prepared by partially hydrolyzing a hydrolyzable organosilane represented by a general formula $$R^1_n SiX_{4-n} \quad (I)$$

wherein $R^1$ is a homo- or hetero-substituted or non-substituted univalent hydrocarbon group or phenyl group having a carbon number of 1 to 9, n is an integer of 0 to 3, and X is a hydrolyzable functional group, in colloidal silica dispersed in an organic solvent, water or a mixture thereof;
  (B) an acrylic resin which is a copolymer of:
    at least one acrylate or methacrylate comonomer represented by a formula $$CH_2=CR^2(COOR^3) \quad (II)$$

wherein $R^2$ is a hydrogen atom or a methyl group, and $R^3$ is a substituted or non-substituted univalent hydrocarbon having a carbon number of 1 to 9;
    at least one acrylate or methacrylate comonomer represented by the formula (II) wherein $R^2$ is a hydrogen or a methyl group, and $R^3$ is an epoxy group, a glycidyl group or a hydrocarbon group containing an epoxy group, a glycidyl group or both; and
    at least one acrylate or methacrylate comonomer represented by the formula (II) wherein $R^2$ is a hydrogen atom or a methyl group, and $R^3$ is a hydrocarbon group containing an alkoxysilyl group or a halogenated silyl group;
  (C) a curing catalyst; and
  (D) a polyorganosiloxane which is represented by a mean composition formula $$R^4_a Si(OH)_b O_{(4-a-b)/2} \quad (III)$$

wherein $R^4$ is a homo- or hetero-substituted or non-substituted univalent hydrocarbon group or phenyl group having a carbon number of 1 to 9, and a and b are numerals satisfying the relationships of $0.2 \leq a \leq 2$, $0.0001 \leq b \leq 3$, and $a+b<4$, respectively, and which contains a silanol group in the molecule.

2. The coating resin composition according to claim 1, wherein 5 to 50 parts by weight of the component (B) out of 100 parts by weight of (A), (B) and (D) and 1 to 94 parts by weight of the component (D) out of 100 parts by weight of (A), (B) and (D) are blended with 1 to 94 parts by weight of the component (A) out of 100 parts by weight of (A), (B) and (D).

3. The coating resin composition according to claim 1, wherein the weight average molecular weight of the component (D) is in a range of 700 to 20,000.

4. A coating resin composition comprising:
  (A) a silica-dispersed oligomer solution of organosilane prepared by partially hydrolyzing a hydrolyzable organosilane represented by a general formula $$R^1_n SiX_{4-n} \quad (I)$$

wherein $R^1$ is a homo- or hetero-substituted or non-substituted univalent hydrocarbon group or phenyl group having a carbon number of 1 to 9, n is an integer of 0 to 3, and X is a hydrolyzable functional group, in colloidal silica dispersed in an organic solvent, water or a mixture thereof;
  (B) an acrylic resin which is a copolymer comprising:
    at least one acrylate or methacrylate comonomer represented by a formula $$CH_2=CR^2(COOR^3) \quad (II)$$

wherein $R^2$ is a hydrogen atom or a methyl group, $R^3$ is a substituted or non-substituted univalent hydrocarbon having a carbon number of 1 to 9;
    at least one acrylate or methacrylate comonomer represented by the formula (II) wherein $R^2$ is a hydrogen atom or a methyl group, and $R^3$ is an epoxy group, a glycidyl group or a hydrocarbon group containing an epoxy group, a glycidyl group or both; and
    at least one acrylate or methacrylate comonomer represented by the formula (II) wherein $R^2$ is a hydrogen atom or a methyl group, and $R^3$ is a hydrocarbon group containing an alkoxysilyl group or a halogenated silyl group;
  (C) a curing catalyst;
  (D) a polyorganosiloxane which is represented by a mean composition formula $$R^4_a Si(OH)_b O_{(4-a-b)/2} \quad (III)$$

wherein $R^4$ is a homo- or hetero-substituted or non-substituted univalent hydrocarbon group or phenyl group having a carbon number of 1 to 9, and a and b are numerals satisfying the relationships of $0.2 \leq a \leq 2$, $0.0001 \leq b \leq 3$, and $a+b<4$, respectively, and which contains a silanol group in the molecule; and
  (E) a pigment.

* * * * *